United States Patent
Peng et al.

(10) Patent No.: US 11,385,344 B2
(45) Date of Patent: Jul. 12, 2022

(54) FREQUENCY-MODULATED CONTINUOUS-WAVE (FMCW) RADAR-BASED DETECTION OF LIVING OBJECTS

(71) Applicant: Aptiv Technologies Limited, St. Michael (BB)

(72) Inventors: Zhengyu Peng, Westfield, IN (US); James F. Searcy, Westfield, IN (US); Ashikur Rahman, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 200 days.

(21) Appl. No.: 16/825,170

(22) Filed: Mar. 20, 2020

(65) Prior Publication Data
US 2021/0293948 A1    Sep. 23, 2021

(51) Int. Cl.
*G01S 13/536* (2006.01)
*G01S 7/35* (2006.01)
*G01S 13/56* (2006.01)

(52) U.S. Cl.
CPC ............ *G01S 13/536* (2013.01); *G01S 7/354* (2013.01); *G01S 13/56* (2013.01); *G01S 7/356* (2021.05)

(58) Field of Classification Search
CPC ........ G01S 13/343; G01S 13/56; G01S 13/04; G01S 13/88; G01S 13/50; G01S 13/536;
(Continued)

(56) References Cited

U.S. PATENT DOCUMENTS

| 6,064,334 A * | 5/2000 | Ikizyan | G01S 13/5246 342/159 |
| 6,753,780 B2 * | 6/2004 | Li | B60N 2/002 180/271 |

(Continued)

FOREIGN PATENT DOCUMENTS

| DE | 102014212390 | 12/2015 |
| EP | 3546979 | 10/2019 |
| WO | 2015184406 | 12/2015 |

OTHER PUBLICATIONS

"Numerical Methods in FEKO—Altair White Paper", Retrieved at: https://resources.altair.com/resfile_web_path/file-en/Numercial_Methods_dec2016.pdf, Dec. 2016, 5 pages.
(Continued)

*Primary Examiner* — Erin F Heard
*Assistant Examiner* — Michael W Justice
(74) *Attorney, Agent, or Firm* — Sawtooth Patent Group PLLC

(57) ABSTRACT

The techniques of this disclosure enable frequency-modulated continuous-wave radar-based detection of living objects. Instead of generating a chirp pattern with each chirp separated by an idle period, a radar generates a chirp pattern with multiple chirps separated by an idle period. From applying a Fourier transform to receiver signals for each frame, the radar determines an amplitude as a function of range for each frame. The radar computes the standard deviation between the amplitudes of two frames and then, for each additional frame, the radar incrementally updates the standard deviation to be inclusive of the amplitude contribution of the additional frame. That is, rather than recalculate the standard deviation for each new frame, the radar increments the standard deviation by a fraction of the amplitude for the new frame, which is proportionate to the total quantity of frames generated thus far. In response to the (Continued)

standard deviation satisfying a noise threshold, the radar outputs an indication of a living object.

20 Claims, 17 Drawing Sheets

(58) Field of Classification Search
CPC ........ G01S 7/539; G01S 7/4802; G01S 7/415; G01S 7/354; G01S 7/356; B60N 2/002
USPC ........................................................ 342/28
See application file for complete search history.

(56) References Cited

U.S. PATENT DOCUMENTS

| | | | |
|---|---|---|---|
| 6,762,712 B2 * | 7/2004 | Kim ..................... | G01C 21/206 342/135 |
| 7,348,880 B2 | 4/2008 | Hules et al. | |
| 9,157,992 B2 * | 10/2015 | Wang ..................... | G01S 7/414 |
| 9,671,492 B2 * | 6/2017 | Diewald ........... | B60R 21/01534 |
| 10,401,479 B2 * | 9/2019 | Mabrouk ................ | G01S 13/52 |
| 10,436,888 B2 * | 10/2019 | Li ........................... | G01S 7/415 |
| 10,457,161 B2 * | 10/2019 | Lu-Dac .................. | B60N 2/286 |
| 10,627,480 B2 * | 4/2020 | Nayyar ................... | G01S 7/352 |
| 10,634,777 B2 | 4/2020 | Oh et al. | |
| 10,705,198 B2 * | 7/2020 | Santra .................... | G01S 13/58 |
| 10,775,493 B2 * | 9/2020 | Santra .................... | G01S 7/354 |
| 11,047,950 B2 * | 6/2021 | Nayyar ................... | G01S 13/42 |
| 11,177,854 B2 | 11/2021 | Ioffe et al. | |
| 2003/0025631 A1 * | 2/2003 | Kim ..................... | G01S 5/0221 342/198 |
| 2003/0201894 A1 * | 10/2003 | Li ......................... | B60N 2/002 340/573.1 |
| 2010/0066595 A1 | 3/2010 | Lee et al. | |
| 2013/0201054 A1 * | 8/2013 | Wang ..................... | G01S 13/04 342/93 |
| 2015/0369911 A1 * | 12/2015 | Mabrouk ............... | G01S 13/52 342/118 |
| 2016/0018511 A1 * | 1/2016 | Nayyar ................. | G01S 13/343 342/27 |
| 2017/0102457 A1 * | 4/2017 | Li ............................. | G01S 7/35 |
| 2018/0170213 A1 * | 6/2018 | Lu-Dac .................... | B60N 2/26 |
| 2019/0302252 A1 * | 10/2019 | Santra ..................... | G01S 7/415 |
| 2019/0302253 A1 * | 10/2019 | Santra ..................... | G01S 13/87 |
| 2019/0310360 A1 * | 10/2019 | Hershkowitz ......... | G01S 13/505 |
| 2020/0111382 A1 | 4/2020 | Sarabandi et al. | |
| 2020/0180472 A1 * | 6/2020 | Lu-Dac ................. | A61B 5/0507 |
| 2020/0225315 A1 * | 7/2020 | Nayyar ................... | G01S 7/352 |
| 2020/0412407 A1 | 12/2020 | Ioffe et al. | |
| 2021/0278498 A1 * | 9/2021 | Nayyar ................. | G01S 13/343 |

OTHER PUBLICATIONS

"Numerical Methods in FEKO White Paper Introduction", Dec. 15, 2016, 5 pages.

Lacik, et al., "On Using Ray-Launching Method for Modeling Rotational Spectrometer", Jun. 2008, 11 pages.

Unpublished European Patent Application EP 19183296, Filed Jun. 28, 2019, Efficient Surrogate Model for Radar-In-Vehicle-Integration Performance Prediction.

EITN90 Radar and Remote Sensing Lecture 6: Target Fluctuation models, 2018, Daniel Sjoberg.

"Extended European Search Report", EP Application No. 21151688. 5, dated Jul. 9, 2021, 8 pages.

"Notice of Allowance", U.S. Appl. No. 16/912,855, filed Aug. 16, 2021, 8 pages.

"Extended European Search Report", EP Application No. 19183296. 3, dated Jan. 3, 2020, 7 pages.

Chipengo, et al., "High Fidelity Physics Simulation of 128 Channel MIMO Sensor for 77GHz Automotive Radar", Sep. 2020, 10 pages.

Chou, "Asymptotic High Frequency Methods", Novel Technologies for Microwave and Millimeter—Wave Applications, Springer, Jan. 2004, 36 pages.

Ling, et al., "Shooting and Bouncing Rays: Calculating the RCS of an Arbitrarily Shaped Cavity", Feb. 1989, pp. 194-205.

Yang, et al., "Novel Extension of SBR-PO Method for Solving Electrically Large and Complex Electromagnetic Scattering Problem in Half-Space", Jul. 2017, pp. 3931-3940.

* cited by examiner

FREQUENCY-MODULATED CONTINUOUS-WAVE (FMCW) RADAR-BASED DETECTION OF LIVING OBJECTS

BACKGROUND

Various sensors are available as occupant detectors within vehicles. Radar is particularly suited for detecting even the most difficult-to-detect living objects, such as passengers who are asleep or remain still. Vital signs (e.g., heartbeat signals, respiration signals) of an infant sleeping under a blanket and/or in a car seat have distinct radar signatures. Frequency-modulated continuous-wave (FMCW) radar systems, with long integration times and small duty cycles, can isolate subtle signal variations introduced by a sleeping child from signal variations introduced by noise and other objects in the field of view, which are not similar to the subtle signal variations introduced by a sleeping child. Thermal noise generated by an FMCW radar can easily mask the subtle signal variations in amplitude introduced over time by stationary living objects; the radar cross-section of a living object, especially a small child at a sedentary condition (e.g., sleeping), is much smaller than, and therefore can easily be masked by, the radar cross-sections of other objects inside the vehicle. The radar cross-section is a measure of how detectable an object is by radar. A larger radar cross-section indicates that an object is more easily detected. Radar reflections that are indicative of a small child's heartbeat or respiration can be indistinguishable from thermal noise.

One way to improve the distinction is by increasing the signal-to-noise ratio (SNR) between radar reflections from living objects and radar reflections from non-living objects (including noise) by increasing the radiation power of the FMCW radar, which aside from using more electrical power, may raise some health concerns. Another way to increase the SNR is to increase the duty cycle of the FMCW radar and apply Fourier transforms to the radar reflections to distinguish the reflections caused by living objects from the reflections caused by stationary objects or noise. This, however, comes at the expense of significantly increasing the computational load and power consumption of the FMCW radar.

SUMMARY

The techniques of this disclosure enable frequency-modulated continuous-wave (FMCW) radar-based detection of living objects. Instead of generating a typical chirp pattern with individual chirps separated by long idle periods, a radar transceiver generates a multiple-chirp pattern with groupings of multiple chirps separated by long idles periods, for each frame. A frame being a duration of time during which the chirp pattern that has a first period of multiple chirps followed by a second period of idle time. From applying a Fourier transform (e.g., a fast Fourier transform, or "FFT") to receiver signals (e.g., digital beat signals including baseband data) for each frame, the radar determines an amplitude of the receiver signals, as a function of range, for each frame. The radar system computes the standard deviation between the amplitudes of two frames and, for each additional frame, the radar incrementally updates the standard deviation between the amplitudes of the two frames to be inclusive of the amplitude contribution of the additional frame. That is, rather than recalculate the standard deviation from scratch in response to each new frame, the radar system "incrementally" adjusts the previous standard deviation by a fraction of the amplitude of the new frame, which is proportionate to the total quantity of frames generated thus far. In response to the adjusted standard deviation satisfying a noise threshold, the radar outputs an indication of a living object. The techniques of this disclosure enable radar-based detection of living objects with an improved signal-to-noise ratio and therefore greater accuracy when compared to conventional FMCW radar systems. Live object detection is improved by the described systems and techniques without increasing radiation power, power consumption, costs, or computational load relative to a conventional FMCW radar system.

In some aspects, a FMCW radar system includes an antenna array, a transceiver configured to generate radar signals via the antenna array, and a processing unit. In one example, the processing unit is configured to direct the transceiver to detect objects by generating, over a plurality of frames, the radar signals having a chirp pattern that has a first period of multiple chirps followed by a second period of idle time. The processing unit applies a Fourier transform to reflections of the radar signals obtained within each of the plurality of frames to determine a respective amplitude, as a function of range, for each of the plurality of frames, and based on the respective amplitude for each of the plurality of frames, determines a standard deviation in the amplitude as a function of range for the plurality of frames. The processing unit is further configured to, in response to the standard deviation in the amplitude for the plurality of frames satisfying a noise threshold, output an indication of a living object detected during the plurality of frames.

In another example, the processing unit is configured to direct the transceiver to detect objects by generating, for a first plurality of frames, radar signals having a chirp pattern that has a first period of multiple chirps followed by a second period of idle time, determine a respective amplitude as a function of range for each of the first plurality of frames, and determine a baseline standard deviation in the amplitude for the first plurality of frames based on the respective amplitude determined for each of the first plurality of frames. The processing unit is further configured to adjust an adaptive noise threshold based on a dynamic noise response of the radar system by smoothing the baseline standard deviation in the amplitude and setting the adaptive noise threshold to the baseline standard deviation in amplitude. The processing unit is further configured to, responsive to a standard deviation in amplitude as a function of range for a second plurality of frames generated using the chirp pattern satisfying the adaptive noise threshold, output an indication of a living object detected during the second plurality of frames.

In a further example, the processing unit is configured to direct the transceiver to detect objects by generating, for a first plurality of frames, radar signals having a chirp pattern that has a first period of multiple chirps followed by a second period of idle time. The processing unit determines a respective amplitude as a function of range for each of the first plurality of frames and determines a first standard deviation for the first plurality of frames based on the respective amplitude determined for each of the first plurality of frames. The processing unit is further configured to store, in a memory, a previous mean amplitude equal to a mean amplitude as a function of range for the first plurality of frames, direct the transceiver to generate the chirp pattern in a subsequent frame to the first plurality of frames, and determine a current mean amplitude equal to the previous mean amplitude adjusted by a fraction of an amplitude, as a function of range, of the subsequent frame. The fraction of the amplitude of the subsequent frame is equal to a difference between the amplitude of the subsequent frame and the previous mean amplitude, the difference being divided by a total quantity of frames among the first plurality of frames and the subsequent frame. The processing unit is further configured to determine a second standard deviation in amplitude as a function of range of the first plurality of frames and the subsequent frame by adjusting the first standard deviation in amplitude by an amount based on the amplitude of the subsequent frame, the previous mean amplitude, and the current mean amplitude. Responsive to the second standard deviation satisfying a noise threshold, the processing unit outputs an indication of a living object detected during the first plurality of frames and the subsequent frame.

This document also describes computer-readable media having instructions for performing methods by the above-summarized FMCW radar systems. Other FMCW radar systems, computer-readable media, and methods are set forth herein, as well as systems and means for performing the aforementioned methods, which are further described below.

This summary is provided to introduce simplified concepts for FMCW radar detection of living objects, which is further described below in the Detailed Description and Drawings. For ease of description, the disclosure focuses on vehicle-based or automotive-based radar systems for detecting passengers as the living objects, such as children or infants sleeping in car seats. However, the techniques and systems described herein are not limited to vehicle or automotive contexts, but also apply to other environments where radar can be used to detect living objects amongst noise. This summary is not intended to identify essential features of the claimed subject matter, nor is it intended for use in determining the scope of the claimed subject matter.

BRIEF DESCRIPTION OF THE DRAWINGS

The details of one or more aspects of FMCW radar-based detection of living objects are described in this document with reference to the following drawings. The same numbers are used throughout the drawings to reference like features and components:

FIG. 4-1 illustrates an amplitude, as a function of range, of a radar signal from an example FMCW radar system.

FIG. 4-2 illustrates a standard deviation of the amplitudes from FIG. 4-2.

FIG. 5-1 illustrates example operations performed by an FMCW radar system.

FIGS. 5-2 and 5-3 illustrate different examples of living-object detectors of an FMCW radar system.

FIG. 5-4 illustrates examples of a standard deviation in an amplitude of radar reflections, as a function of range, determined by the living-object detectors of FIG. 5-2 and FIG. 5-3, in contrast to a standard deviation in an amplitude of a conventional radar system.

FIG. 6-1 illustrates example operations performed by an FMCW radar system.

FIGS. 6-2 and 6-3 illustrate different examples of adaptive-threshold adjusters of an FMCW radar system.

FIG. 6-4 illustrates an example adaptive threshold during part of a frame generated by an FMCW radar system that uses the example adaptive-threshold adjusters of FIG. 6-2 or FIG. 6-3.

FIG. 7-1 illustrates example operations performed by an FMCW radar system.

FIGS. 7-2 through 7-4 illustrate an example of power drift in an FMCW radar system.

FIG. 7-5 illustrates an example adaptive threshold during part of a frame generated by an FMCW radar system that corrects for power drift.

DETAILED DESCRIPTION

Figure 1:
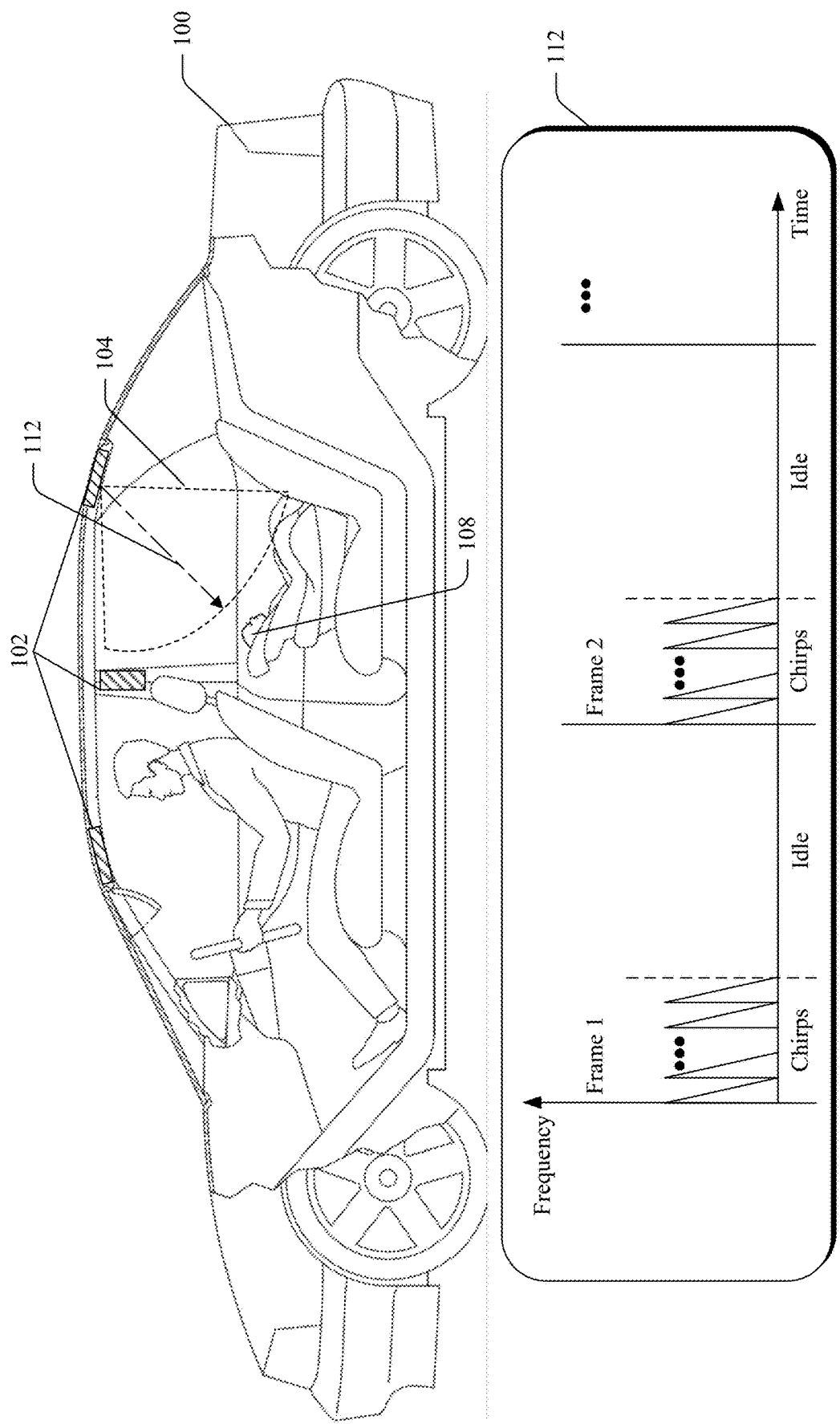
FIG. 1 illustrates an example vehicle in which an example FMCW radar system can detect living objects.

The details of one or more aspects of radar-based detection of living objects are described below. With long integration times and small duty cycles, conventional FMCW radar systems are particularly suited for identifying subtle variations in radar reflections introduced by mostly stationary living objects from among variations in radar reflections introduced by other, non-living objects. However, thermal noise generated by the radar, as well as noise from other sources, can obscure the radar cross-section (RCS) of a human body, especially the body of a small child, which can make detecting living objects difficult or unreliable.

In contrast to these conventional FMCW radar systems, this document describes a more-reliable FMCW radar system for use as a living-object detector. In accordance with techniques of this disclosure, a FMCW radar system uses an atypical (multiple) chirp pattern for each frame. This increases the signal-to-noise ratio (SNR) between amplitudes of reflections from objects that are alive, and amplitudes of reflections from non-living objects and noise, including thermal noise from the radar itself. For example, the motion pattern from other objects are generally, not similar to the periodicity and amplitude of a moving chest wall of a child. The SNR is increased without increasing radiation power, which aside from preserving electrical power, may reduce some health concerns. The example FMCW radar system increases the SNR without increasing computational load, power consumption, or cost.

Instead of a typical chirp pattern with individual chirps separated by a long idle period, the radar system generates, for a plurality of frames, a repeating-multiple chirp pattern that has a first period of multiple chirps and a second, lengthier period of idle time for each frame. The period of idle time can be orders of a magnitude longer than the first period of the frame. From applying a Fourier transform to individual or averaged receiver signals (e.g., digital beat signals including baseband data) determined from reflections obtained during the plurality of frames, the FMCW radar system determines a respective amplitude, as a function of range, for each of the plurality of frames. From the respective amplitude for each of the plurality of frames, the FMCW radar system computes a standard deviation of the amplitude for the plurality of frames. The FMCW may incrementally update the standard deviation, as a function of range, as each new frame is generated. That is, rather than recalculate the standard deviation each time a new frame is generated, the FMCW radar system can adjust the standard deviation by an amount proportional to the individual contribution of the amplitude of the new frame relative to the standard deviation of the previous frames.

In response to the standard deviation of the amplitude satisfying a noise threshold, the FMCW radar system outputs an indication of a living object detected during the plurality of frames. The FMCW radar system may rely on a predetermined threshold, set to a predetermined level based on observed characteristics of the FMCW radar system. In other examples, the FMCW radar system uses an adaptive noise threshold that changes according to a dynamic noise response of the radar system, including, compensating for power drift in the amplitude of the receiver signals, particularly during power-up. The techniques of this disclosure enable FMCW radar-based detection of living objects with an improved signal to noise ratio and therefore greater accuracy when compared to other radar-based detection systems.

Example Environment

FIG. 1 illustrates a vehicle 100 in which an example FMCW radar system 102 can detect living objects, e.g., human and animal living occupants. Although illustrated as a car, the vehicle 100 can represent other types of motorized vehicles (e.g., a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite).

The FMCW radar system 102 (referred to simply as "the radar system 102") is mounted to, or integrated within, the vehicle 100. The techniques and systems described herein are not limited to vehicles or automotive contexts, but also apply to other mobile and non-mobile environments (e.g., residential or commercial heating and cooling systems, lighting systems, security systems) where live-object-detection may be useful, including machinery, robotic equipment, buildings and other structures.

The radar system 102 is capable of detecting one or more objects that are within proximity to the vehicle 100. Specifically, the radar system 102 is configured for interior, as opposed to exterior, vehicle sensing. The radar system 102 is configured to detect signs of life from objects that are alive and inside the vehicle 100.

In the depicted implementation, the radar system 102 is located inside the vehicle 100 near the ceiling. In other implementations, the radar system 102 can be mounted in other parts of the vehicle 100. The radar system 102 transmits radar signals and receives radar reflections in a portion of the vehicle 100 that is encompassed by a field-of-view 104. The field-of-view 104 includes one or more areas occupied by passengers or other living occupants of the vehicle 100. A living object 108, which may sometimes be referred to as a living target, is seated in a front or rear passenger seat, which is within the field-of-view 104.

The radar system 102 is shown having three different parts positioned at different locations of the vehicle 100. The radar system 102 can include additional or fewer parts in some implementations. Sometimes referred to as modules or radar systems themselves, the parts of the radar system 102 can be designed and positioned to provide a particular field of view 104 that encompasses a specific region of interest. Example fields of view 104 include a 360-degree field of view, one or more 180-degree fields of view, one or more 90-degree fields of view, and so forth, which can overlap (e.g., for creating a particular size field of view). The living object 108 is an infant in a car seat. The living object 108 can be any other human or animal occupant that reflects radar signals. The radar system 102 and the vehicle 100 are further described with respect to FIG. 2.

In general, the radar system 102 is configured to detect the living object 108 by generating, over a plurality of frames, a chirp pattern that has a first period of multiple chirps followed by a second period of idle time for each frame. For example, a radar signal 112 is shown in FIG. 1 which includes the chirp pattern described, where in each frame, the radar signal 112 includes a repeating pattern of two or more chirps followed by an idle period where the radar signal 112 remains silent until the next frame. The period of idle time is longer than the period of multiple chirps. For example, the first period of each frame with the multiple chirps is approximately two or more microseconds and the second period is less than approximately 100 milliseconds.

The radar system 102 is configured to apply a Fourier transform to the reflected signals corresponding to the pattern of multiple chirps within each of the plurality of frames of the radar signal 112. Using results obtained from application of the transformation, the radar system 102 is configured to determine a respective amplitude, as a function of range, for each of the plurality of frames. From the respective amplitudes, the radar system 102 is configured to determine a standard deviation in the amplitude, as a function of range, for the frames of the radar signal 112.

The radar system 102 may incrementally update the standard deviation in the amplitude, as each frame is generated. For example, rather than recalculate the standard deviation each time a new frame is generated, the radar system 102 is configured to adjust the standard deviation by a fraction of the amplitude for the new frame. The fraction of the amplitude is proportional to the individual contribution of the new frame relative to the contribution of the previous frames.

The radar system 102 operates according to a noise threshold. In some examples, the noise threshold is an adaptive threshold that adjusts over time. By adjusting the noise threshold based on changes to a dynamic noise response of the radar system 102, including by compensating for power drift in the amplitude of the radar signal 112, particularly during power-up, the radar system 102 can more accurately detect living objects.

In response to the standard deviation satisfying the noise threshold, the radar system 102 is configured to output an alert or other indication of the living object 108 detected during the plurality of frames of the radar signal 112. For example, the field-of-view 104 includes one or more areas occupied by passengers of the vehicle 100 and the radar system outputs an indication of living object 108 detected in the vehicle 100. A processing unit of the radar system 102 outputs the indication of the living object 108 to an alert system, which in response, outputs an audible, visual, or haptic feedback to a human or machine about an occupant inside an unattended vehicle. The alert system may provide an alarm monitoring service which notifies the owner(s) of the vehicle 100 via telephone and if unsuccessful in contacting the owner, contacts help (e.g., local police, fire, or ambulance services). In response to the indication of the living object 108, the alert system may take action, for example, by directing the vehicle 100 to heat, cool, or ventilate the interior of the vehicle 100 in response to receiving an indication of the living object 108.

The atypical chirp pattern of the radar signal includes a chirp pattern having multiple chirps, instead of a chirp pattern that includes a single chirp which proceeds each idle period of the chirp pattern generated by the radar system 102. The atypical chirp pattern of the radar signal increases the SNR between radar reflections detected from living objects and other radar reflections detected from stationary objects and noise. The SNR is increased without increasing radiation power of the radar system 102, which aside from preserving electrical power, may reduce some health concerns related to operating the radar system 102 near the living object 108 or other occupants of the vehicle 100. The radar system 102 thus increases the SNR without increasing computational load, power consumption, or cost.

Figure 2:
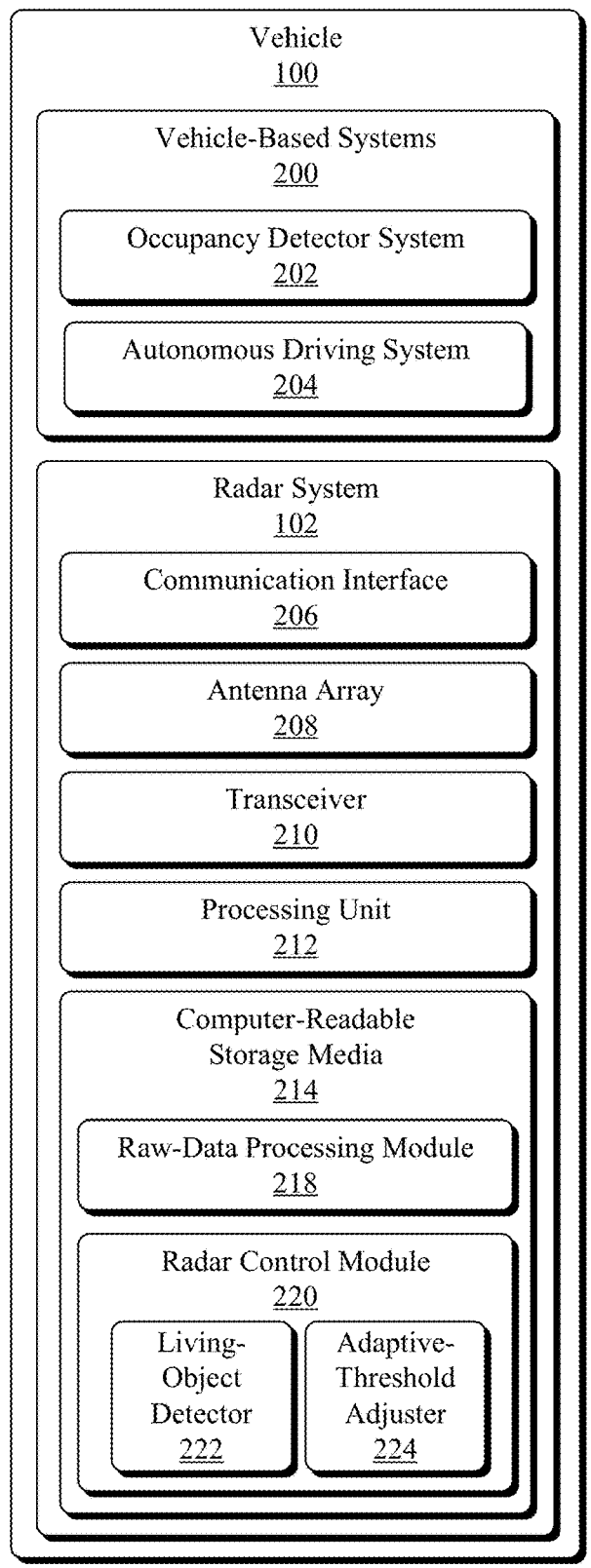
FIG. 2 illustrates an example implementation of a FMCW radar system as part of a vehicle.

FIG. 2 illustrates an example implementation of the radar system 102 as part of the vehicle 100. The vehicle 100 includes vehicle-based systems 200 that rely on data from the radar system 102, such as an occupancy detector system 202 and an autonomous driving system 204. Generally, the vehicle-based systems 200 use radar data provided by the radar system 102 to perform a function. For example, the autonomous driving system 204 takes control of the vehicle 100 in response to the radar system 102 detecting a sleeping driver to bring the vehicle safely to a stop. The occupancy detector 202 sounds an alarm of the vehicle 100 and/or ventilates the vehicle 100 in response to the radar system 102 detecting a child or pet inadvertently left in the vehicle 100, unattended.

The radar system 102 includes a communication interface 206 to transmit the radar data to the vehicle-based systems 200 or to another component of the vehicle 100 over a communication bus of the vehicle 100, for example, when the individual components shown in the radar system 102 are integrated, including at different positions or locations, within the vehicle 100. In general, the radar data provided by the communication interface 206 is in a format usable by the vehicle-based systems 200. The communication interface 206 may provide information to the radar system 102, such as the speed of the vehicle 100, the interior temperature of the of the vehicle 100, etc. The radar system 102 can use this information to appropriately configure itself. For example, the radar system 102 can enter "occupant-detection mode" where the radar system 102 configures itself to generate each frame with a multiple chirp pattern in response to receiving an indication that the vehicle 100 is parked and/or an internal temperature is above or nearing an unsafe temperature for human or animal occupants.

The radar system 102 also includes at least one antenna array 208 and a transceiver 210 to transmit and receive radar signals. The antenna array 208 includes a transmit antenna element, for example, one per each transmit channel. A receive antenna element of the antenna array 208 is coupled to each receive channel to receive radar reflections in response to the radar signals. The antenna array 208 can include multiple transmit antenna elements and multiple receive antenna elements to configure the radar system 102 as a MIMO (Multiple Input Multiple Output) radar system capable of transmitting multiple distinct waveforms at a given time (e.g., a different waveform per transmit antenna element). The antenna elements can be circularly polarized, horizontally polarized, vertically polarized, or a combination thereof.

Using the antenna array 208, the radar system 102 can form beams that are steered or un-steered, and wide or narrow. The steering and shaping can be achieved through analog beamforming or digital beamforming. The one or more transmitting antenna elements can have an un-steered omnidirectional radiation pattern, or the one or more transmitting antenna elements can produce a wide steerable beam to illuminate a large volume of space. To achieve object angular accuracies and angular resolutions, the receiving antenna elements can be used to generate hundreds of narrow steered beams with digital beamforming. In this way, the radar system 102 can efficiently monitor an external or internal environment of the vehicle 100 to detect one or more objects within the field-of-view 104.

The transceiver 210, which may include multiple transceivers, includes circuitry and logic for transmitting radar signals and receiving radar reflections (also sometimes referred to as radar receive signals or radar returns) via the antenna array 208. A transmitter of the transceiver 210 includes one or more transmit channels and a receiver of the transceiver 210 includes one or more receive channels, which may be of a similar or different quantity than a quantity of the transmit channels. The transmitter and receiver may share a local oscillator (LO) to synchronize operations. The transceiver 210 can also include other components not shown, such as amplifiers, mixers, phase shifters, switches, analog-to-digital converters, combiners, and the like.

The transceiver 210 is primarily configured as a continuous-wave transceiver 210 to execute FMCW operations, and may also include logic to perform in-phase/quadrature (I/Q) operations and/or modulation or demodulation in a variety of ways, including linear-frequency modulations, triangular-frequency modulations, stepped-frequency modulation, or phase modulation. The transceiver 210 may be configured to support pulsed-radar operations, as well.

A frequency spectrum (e.g., range of frequencies) of radar signals and radar reflections can encompass frequencies between one and ten gigahertz (GHz), as one example. The bandwidths can be less than one GHz, such as between approximately three hundred megahertz (MHz) and five hundred MHz. The frequencies of the transceiver 210 may be associated with millimeter wavelengths.

The radar system 102 also includes at least one processing unit 212 and computer-readable storage media (CRM) 214. The CRM 214 includes a raw-data processing module 218 and a radar control module 220. The raw-data processing module 218 and the radar control module 220 can be implemented using hardware, software, firmware, or a combination thereof. In this example, the processing unit 212 executes instructions for implementing the raw-data processing module 218 and the radar control module 220. Together, the raw-data processing module 218 and the radar control module 220 enable the processing unit 212 to process responses from the receive antenna elements in the antenna array 208 to detect the living object 108 and generate radar data for the vehicle-based systems 200.

The raw-data processing module 218 transforms receiver signals including raw data (e.g., digital beat signals including baseband data) provided by the transceiver 210 into radar data (e.g., an amplitude as a function of range) that is usable by the radar control module 220. The radar control module 220 analyzes the radar data obtained over time to map one or more detections, e.g., of living objects. The radar control module 220 determines whether a living object 108 is present within the field-of-view 104 using a living-object detector 222 and optionally, an adaptive-threshold adjuster 224.

The living-object detector 222 causes the radar control module 220 to operate in an occupant-detection mode where the radar signal 112 is analyzed for signs of living objects obscured by (e.g., thermal) noise. The living-object detector 222 determines a standard deviation between multiple frames to isolate stationary living objects, which move even if only to breath, from non-living objects, which remain mostly stationary from one frame to the next. The living-object detector 222 uses a noise threshold to determine whether the standard deviation at a particular range from the radar system 102 is a living object. The noise threshold is set to ensure that the movement is sufficient to indicate presence of a living object. Using the noise threshold, the radar system 102 can differentiate between a living object and either a stationary object or thermal noise produced by the radar system 102.

The living-object detector 222 may determine a respective amplitude as a function of range for each of M plurality of frames by applying a Fourier transform, such as an FFT, to respective receiver signals of the N chirps in each frame. In processing the radar signal 112, for example, the living-object detector 222 applies a Fourier transform to the receiver signal of each chirp in each frame. The results of each of the Fourier transforms are integrated over frames, using non-coherent integration (NCI). The living-object detector 222 determines a respective amplitude as a function of range for each of the M plurality of frames. A standard deviation of the amplitude as a function of range between two or more of the plurality of frames is determined by integrating, using non-coherent integration, results of the Fourier transform applied to the respective receiver signal of each new frame M, with the standard deviation in amplitude over the previously received, plurality of frames 1 through (M−1).

The adaptive-threshold adjuster 224 is an optional component of the radar system 102. The living-object detector 222 may rely on the adaptive-threshold adjuster 224 to set the noise threshold used by the living-object detector 222 while the radar system 102 is operating in the occupant-detection mode. As the environment within the vehicle 100 changes, the adaptive-threshold adjuster 224 automatically sets the noise threshold used, by the radar system 102, to detect a living object by accounting for the environmental changes. For example, during power-on, the radar signal 112 may undergo power drift until settling down to a normal level. As the effects of power drift become less, the adaptive-threshold adjuster 224 modifies the noise threshold settle to a nominal level. Over time, as the environment continues to change, the adaptive-threshold adjuster 224 increases and decreases the noise threshold with changes in noise levels, smoothing changes to the noise threshold between sequential frames.

The radar control module 220 produces the radar data for the vehicle-based system 200. Example types of radar data include a Boolean value that indicates whether or not the object 108 is present within a particular region of interest, a number that represents a characteristic of the object 108 (e.g., position, speed, or direction of motion), or a value that indicates the type of object 108 detected (e.g., a living or non-living). The radar control module 220 configures the transceiver 210 to emit radar signals and detect radar reflections via the antenna array 208. The radar control module 220 outputs information associated with the radar reflections detected from radar signals that reach objects, such as the object 108.

Figure 3:
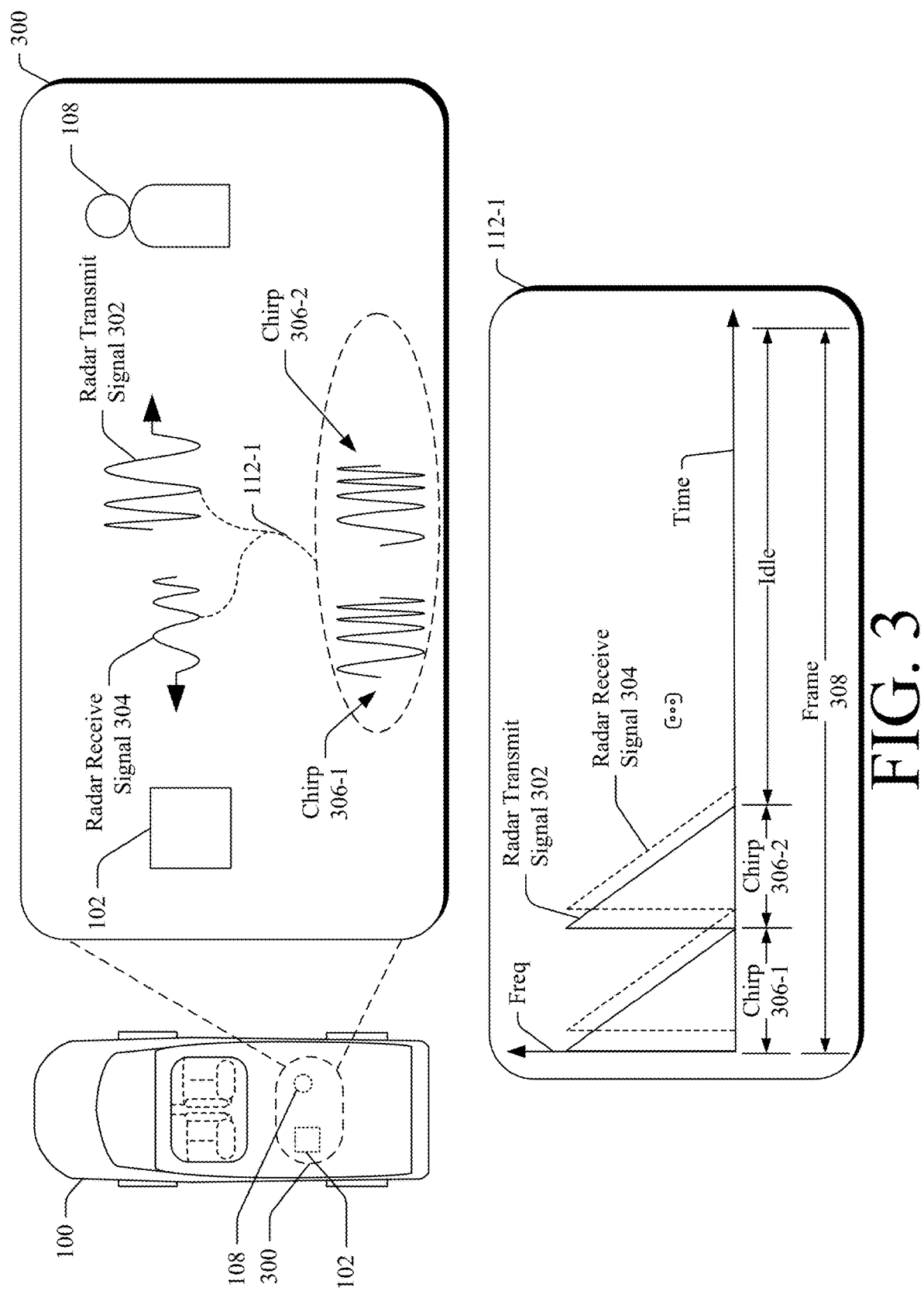
FIG. 3 illustrates an example operation of an example FMCW radar system.

FIG. 3 illustrates an example operation 300 of the radar system 102. Within the vehicle 100, the living object 108 is located at a particular slant range and angle from the antenna array of the radar system 102. To detect the living object 108, the radar system 102 transmits and receives a radar signal 112-1, which is an example of a frame 308 of the radar signal 112. The radar signal 112-1 is transmitted as a radar transmit signal 302. At least a portion of the radar transmit signal 302 is reflected by the living object 108. This reflected portion represents a radar reflection or a radar receive signal 304. The radar system processes the radar receive signal 304 to extract data for a vehicle-based system, such as the vehicle-based systems 200. As shown in FIG. 3, an amplitude of the radar receive signal 304 is smaller than an amplitude of the radar transmit signal 302 due to losses incurred during propagation and reflection.

Although the radar transmit signal 302 is illustrated as having a single waveform, the radar transmit signal 302 can be composed of multiple radar transmit signals 302 that have distinct waveforms to support MIMO operations. Likewise, the radar receive signal 304 can be composed of multiple radar receive signals 302 that also have different waveforms.

The radar transmit signal 302 includes one or more chirps 306-1 to 306-N, where N represents a positive integer. The radar system 102 can transmit the chirps 306-1, 306-2, . . . , 306-N (collectively "the chirps 306") in a continuous sequence or transmit the chirps as time-separated pulses. The chirps 306, when followed by a period of idle time, represent a frame 308. The radar transmit signal 302 can include a quantity of M frames 308, where M represents a positive integer.

Individual frequencies of the chirps 306 can increase or decrease over time, but the slope or rate of change in the individual frequencies between the chirps 306 can be consistent. In the depicted example, the radar system 102 employs a single-slope cycle to linearly decrease the frequencies of the chirps 306 over time. Other types of frequency modulations are also possible, including a two-slope cycle and/or a non-linear frequency modulation. In general, transmission characteristics of the chirps 306 (e.g., bandwidth, center frequency, duration, and transmit power) can be tailored to achieve a particular detection range, range resolution, or Doppler coverage for detecting the living object 108.

At the radar system 102, the radar receive signal 304 represents a delayed version of the radar transmit signal 302. The amount of delay is proportional to the slant range (e.g., distance) from the antenna array 208 of the radar system 102 to the living object 108. In particular, this delay represents a summation of a time it takes for the radar transmit signal 302 to propagate from the radar system 102 to the living object 108 and a time it takes for the radar receive signal 304 to propagate from the living object 108 to the radar system 102. If the living object 108 and/or the radar system 102 is moving, the radar receive signal 304 is shifted in frequency relative to the radar transmit signal 302 due to the Doppler effect. In other words, characteristics of the radar receive signal 304 are dependent upon motion of the living object 108 and/or motion of the vehicle 100. Similar to the radar transmit signal 302, the radar receive signal 304 is composed of one or more of the chirps 306. The chirps 306 enable the radar system 102 to make multiple observations of the object living 108 over a first time period during each of the frames 308.

Where the radar system 102 is used to detect very slow motions, such as movements of a chest wall during respiration and heartbeat, amplitude of the radar receive signals 304 within a few microseconds will not change much. The radar signal 112-1 is based on a waveform structure with a combination of fast chirps and very slow chirps (or idle time) in each frame 308. The fast chirps 306 are followed by an idle period. The waveform includes N fast chirps 306 during a repetition period of a few microseconds. After the N fast chirps 306, a long idle period of the waveform precedes the start of the next frame 308. The idle period may be as long as 100 milliseconds. Each set of N fast chirps 306 in combination with the idle period forms a slow frame 308.

The operation 300 is further described in the context of FIG. 2. During transmission, the transceiver 210 accepts a control signal from the processing unit 212. Using the control signal, the processing unit 212 directs the transceiver 210 to operate in a particular configuration or operational mode, such as an occupant-detection mode. As an example, the control signal can specify types of waveforms to be generated by the transmit channels of the transceiver 210. Different waveform types can have a different N quantity of chirps 306, M quantity of frames 308, chirp durations, frame durations, center frequencies, bandwidths, types of frequency modulation (e.g., a single-slope modulation, a two-slope modulation, a linear modulation, or a non-linear modulation), or types of phase modulations (e.g., different orthogonal coding sequences). Additionally, the control signal can specify which transmit channels are enabled or disabled. In the example of FIG. 3, the control signal specifies the characteristics of the radar signal 112-1 as having a quantity of N chirps 306, a recurring idle time at the end of each frame 308, and a total quantity of M frames 308.

Based on the control signal, the transceiver 210 generates a frequency-modulated radar signal 112-1 at radio frequencies on the transmit channels. A phase modulator of the transceiver 210, may modulate phases of chirps within the frequency-modulated radar signal to generate a frequency-modulated and phase-modulated radar signal in cases where phase-modulation is used. For example, the phases of the chirps 306 can be determined based on a coding sequence specified by the control signal. The control signal directs the transceiver 210 to transmit a FMCW radar signal and in return receive FMCW radar reflections from objects in the field-of-view 104.

During reception, the receive antenna elements of the antenna array 208 receive a version of a radar receive signal 304. Relative phase differences between these versions of the radar receive signal 304 are due to differences in locations of the receive antenna elements and the transmit antenna elements of the antenna array 208. Within each receive channel, a mixer performs a beating operation, which down-converts and demodulates the radar receive signals 304 to generate corresponding beat signals.

A frequency of a beat signal for a chirp pattern that relies on a chirp pattern with a single chirp 306 between each idle period corresponds to a difference in frequency between the radar transmit signal 302 and the radar receive signal 304. This frequency difference is proportional to a slant range between the antenna array 208 and the object 108. The beat signal for each frame 308 represents a combination of the beat signals for some or all of the chirps 306 within each frame 308.

Figures 1, 4:
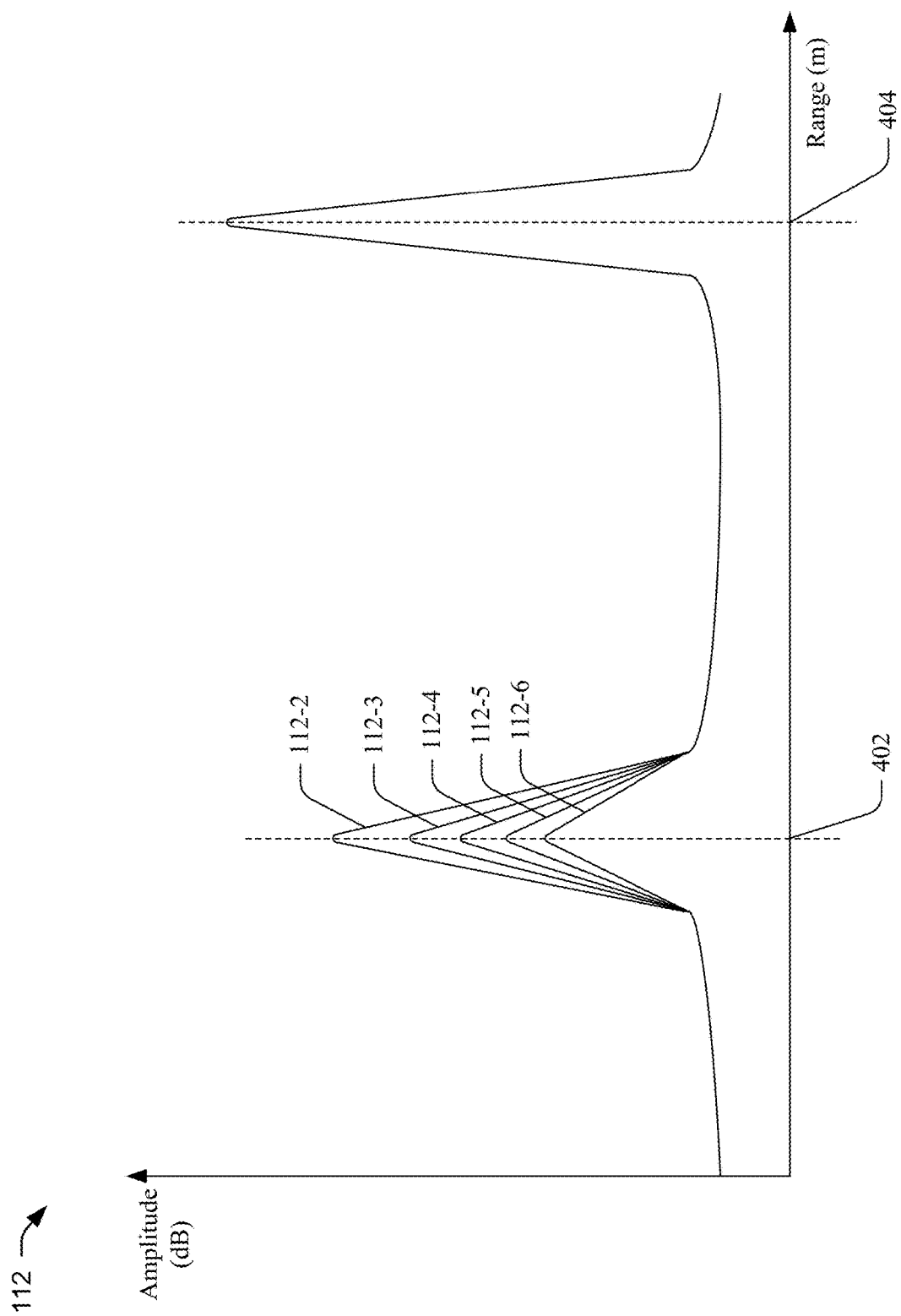
Figures 2, 4:
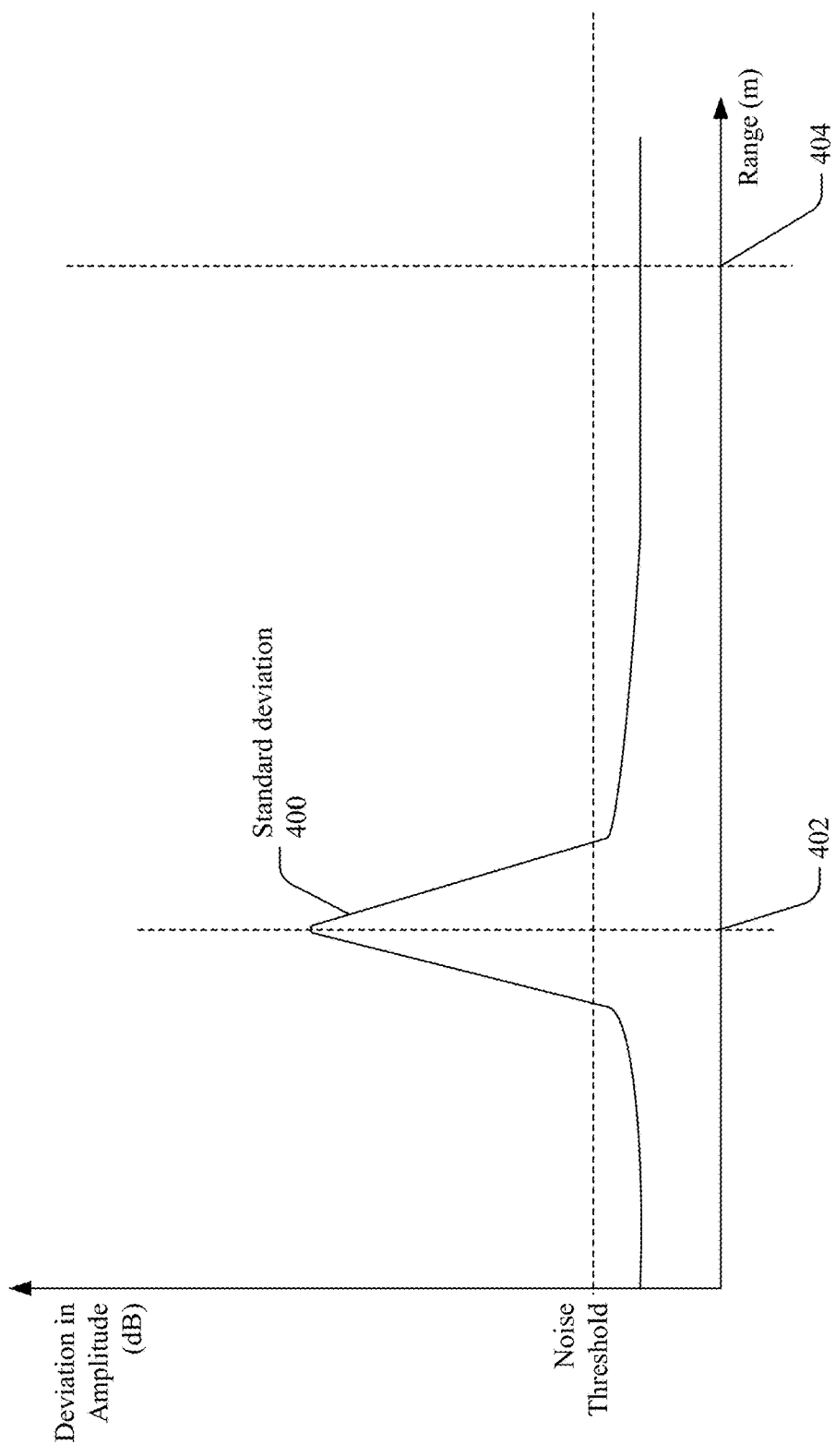

FIG. 4-1 illustrates amplitudes, as a function of range, of multiple radar signals received by an example FMCW radar system. As depicted in FIG. 4-1, the radar system 102 receives radar signals 112-2 through 112-6, which are each an example of a frame 308 of the radar signal 112. The radar system 102 determines amplitudes of the radar signals 112-2 through 112-6 as a function of range. Each of the radar signals 112-2 through 112-6 is unique to a single frame 308. At a range of 402, the peak amplitude of each of the radar signals 112-2 through 112-6 decreases from one signal to the next. The change in amplitude across a sequence of frames 308 at the range 402 indicates movement at the range 402. In contrast, at 404 and most other ranges, the amplitude of the radar signals 112-2 through 112-6 remains consistent from one frame 308 to the next. A consistent amplitude between frames 308, e.g., at the range 404 and other ranges excluding the range 402, indicates a lack of movement at a particular range.

Due to radar-cross-section-decorrelation at certain ranges, the radar system 102 detects enough amplitude variation. Decorrelation occurs when the observation of radar-cross-section is significantly changed by an alteration of time, frequency, or angle. Once a target moves about a range, geometry of a reflecting surface undergoes some changes and hence radar-cross-section-decorrelation occurs. This radar-cross-section-decorrelation is the source of amplitude variation for detecting a living object. A choice of frequency is dependent on an amount of fluctuation expected for a particular geometry of the reflecting surface.

The variable peaks of the radar signals 112-2 through 112-6 at the range 402 from one frame 308 to the next frame 308 can be indicative of a moving or living object at that range. The lack of movement at a particular range, however, from one frame 308 to the next frame 308 can be indicative of a stationary or non-living object at that range. To determine whether the variable peaks are indicative of a living object, the radar system computes a standard deviation 400 of the amplitude, as a function of range, of the radar signals 112-2 through 112-6.

FIG. 4-2 illustrates the standard deviation 400 of the radar signal 112 from FIG. 4-1. As in FIG. 4-1, the standard deviation 400 of the radar signals 112-2 through 112-6, is depicted as a function of range. The standard deviation 400 is mostly consistent and below a noise threshold for the multiple frames 308. However, at the range 402, where each of the radar signals 112-2 through 112-6 peaks with varying amplitudes, the standard deviation 400 of the radar signals 112-2 through 112-6 is above the noise threshold, which is indicative of movement. Certain movement, for example, when the standard deviation 400 exceeds the noise threshold and/or has other characteristics (e.g., a rate of repetition), may be indicative of a vital sign from a living object. A deviation in amplitude above the noise threshold, for multiple sets of frames 308, may be a sign of respiration or a heartbeat. The radar system 102 detects a living object in response to detecting movement over multiple successive frames with sufficient deviation to be indicative of a living object. For example, in response to determining that the standard deviation 400 for multiple frames 308 exceeds the noise threshold at the range 402, the radar system 102 outputs an indication of a detection of a living object.

Figures 1, 5:
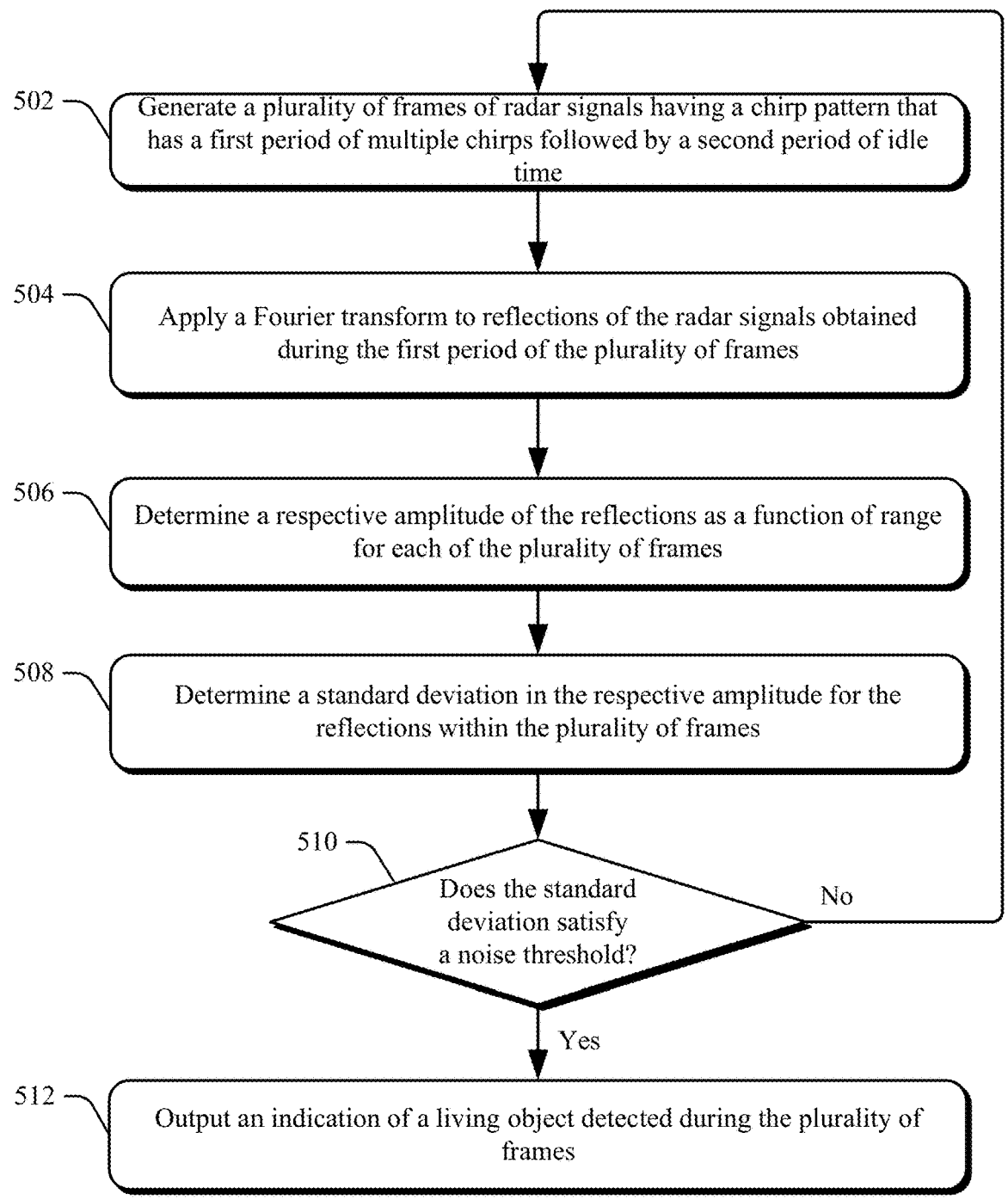
Figure 5:
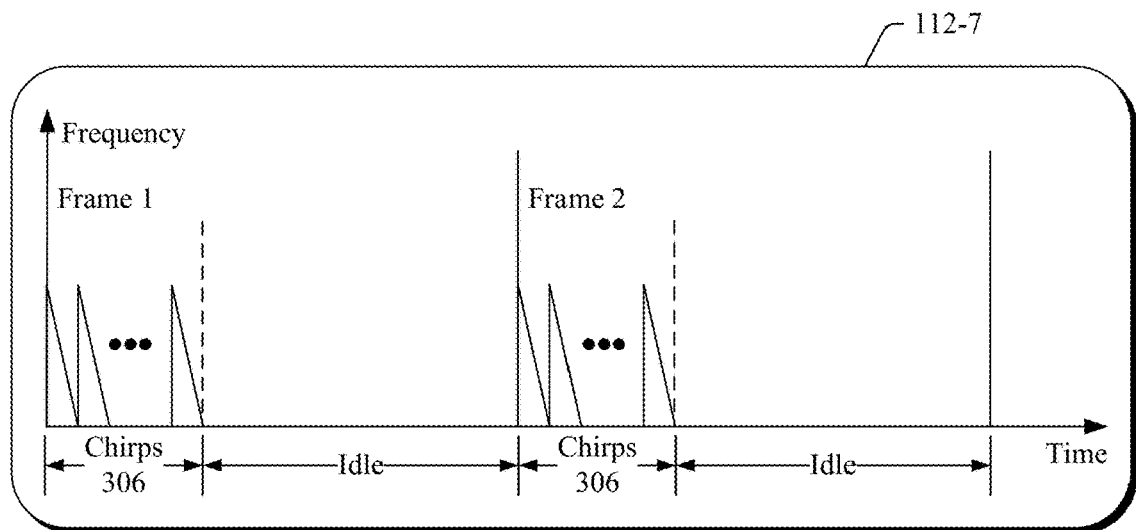
Figure 2:
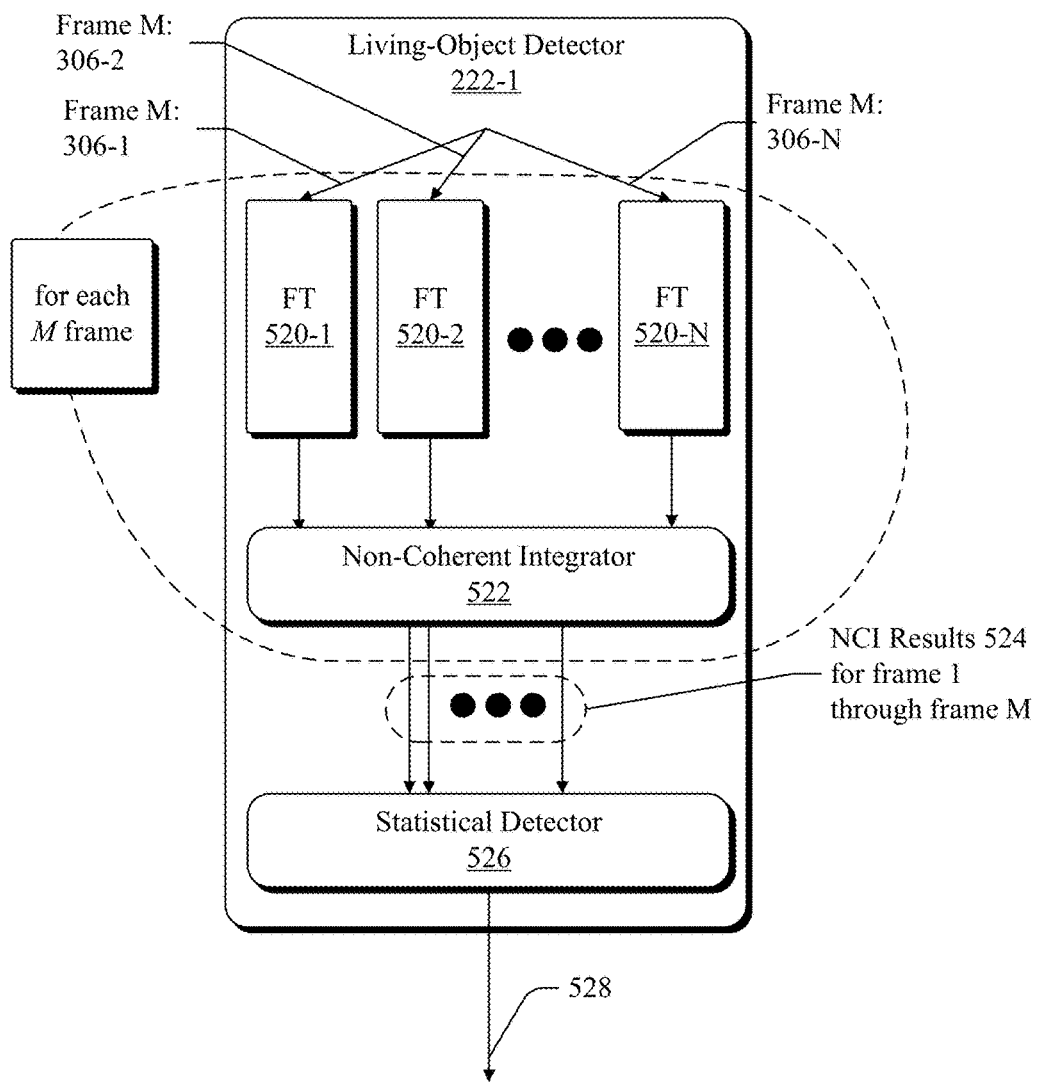
Figure 5:
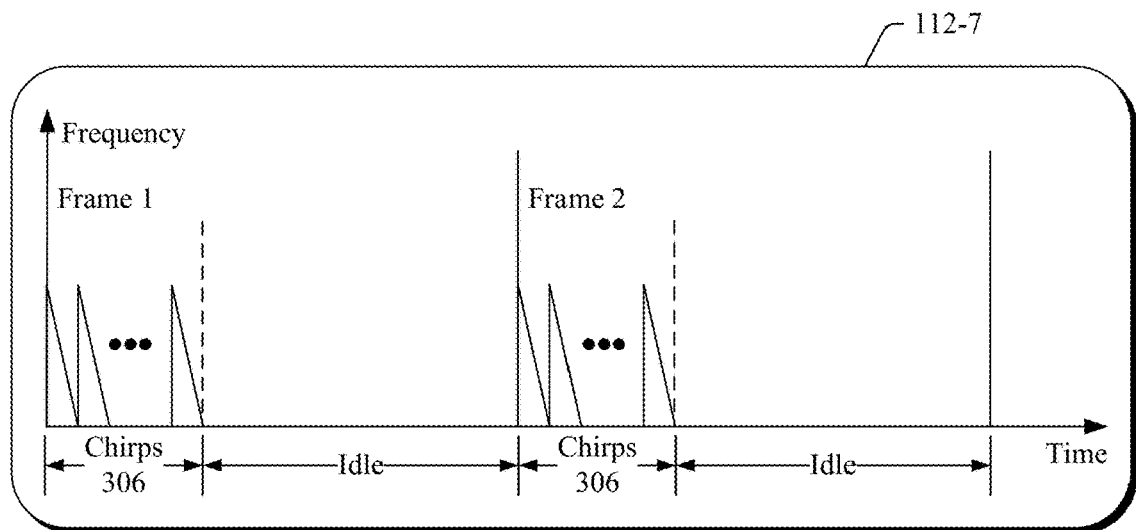
Figure 3:
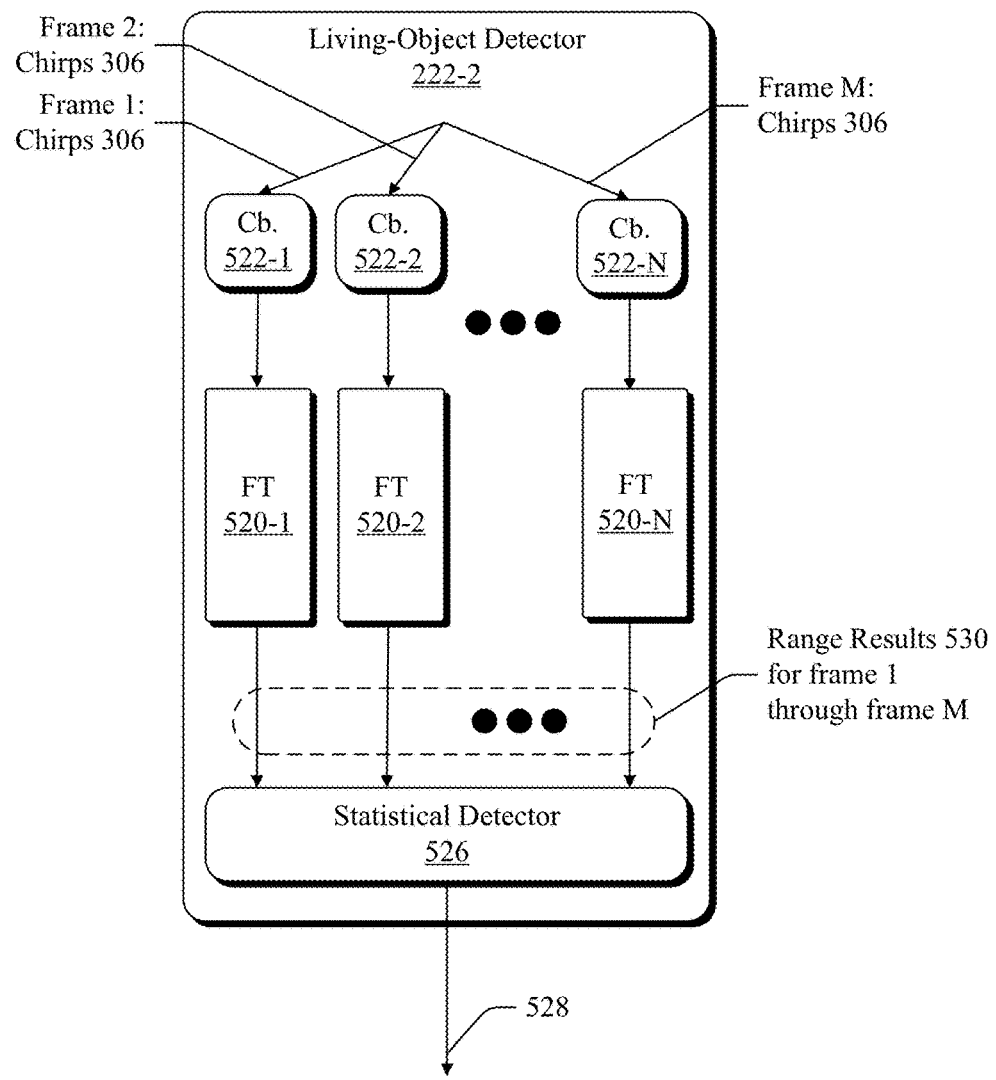
Figures 4, 5:
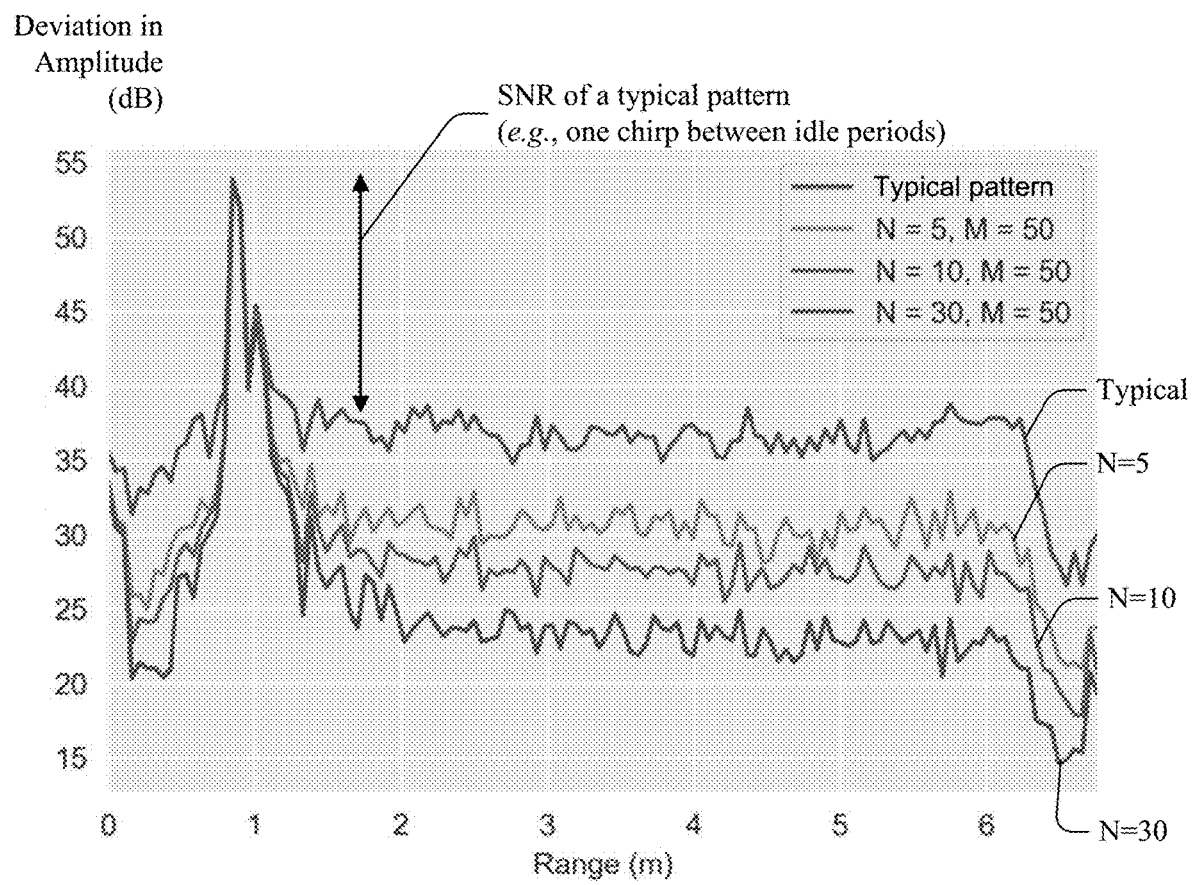

FIG. 5-1 illustrates example operations performed by an FMCW radar system, such as the radar system 102. For example, the processing unit 212 configures the radar system 102 to perform operations 502 through 512 by executing instructions associated with the radar control module 220, the living-object detector 222, or the adaptive-threshold adjuster 224. The operations (or acts) 502 through 512 are performed but not necessarily limited to the order or combinations in which the operations are shown herein. Further, any of one or more of the operations may be repeated, combined, or reorganized to provide other operations.

At 502, the radar system 102 generates a plurality of frames using a chirp pattern that has a first period of multiple chirps followed by a second period of idle time. For example, the radar signal 112, including the chirps 306, is generated for a plurality of frames 308.

At 504, the radar system 102 applies a Fourier transform to the generating of the first period within each of the plurality of frames. For example, the radar system applies a fast Fourier transform to a receiver signal of each of the chirps 306. The radar system 102 may instead collectively apply a Fourier transform to the chirps 306 by applying the Fourier transform to a combined (e.g., averaged, summed) receiver signal for the chirps 306 in each frame 308.

At 506, the radar system 102 determines a respective amplitude as a function of range for each of the plurality of frames. At 508, the radar system 102 determines a standard deviation in the respective amplitude, as a function of range, between at least two of the plurality of frames. When captured over several frames 308, the radar signal 112 may have the standard deviation 400.

At 510, the radar system determines whether the standard deviation satisfies a noise threshold. If "No" at 510, the standard deviation does not satisfy the noise threshold at any range, and the radar system 102 returns to operation 502 to repeat the generating process. If "Yes" at 510, the standard deviation range satisfies the noise threshold and a moving object, specifically a living object, is detected. When captured over several frames 308, the radar signal 112 may have the standard deviation 400, which indicates a living object detected at the range 402.

At 512, an indication of a living object detected during the at least two of the frames is output. For example, the radar system 102 generates radar data usable by the vehicle-based systems 200 in controlling the vehicle 100. The vehicle-based systems 200 may control heating or cooling to maintain a particular temperature or temperature range within the vehicle 100. For example, in response to detecting a living object in the vehicle 100 while the vehicle 100 is heating or cooling towards an unsafe temperature, the vehicle-based systems 200 turn on a heating and cooling system or open a window to ventilate and keep the vehicle 100 within a safe range of temperatures.

FIGS. 5-2 and 5-3 illustrate different examples of the living-object detector 222 of the radar system 102. Each of the FIGS. 5-2 and 5-3 is described in the context of the radar signal 112 from FIG. 1, which is reproduced in FIGS. 5-2 and 5-3 for readability. The radar system 102 may perform the operations 502 through 512 by causing the processing unit 212 to execute instructions associated with a living-object detector 222-1 or 222-2, each of which is an example of the living-object detector 222. The radar signal 112 includes a plurality, M, of frames using a chirp pattern that has a period of multiple, N, chirps 306 followed by a second period of idle time, which is free from chirps.

The living-object detector 222-1 is configured to apply one of Fourier Transforms (FT) 520-1 through 520-N (collectively referred to as "Fourier transforms 520") to a respective receiver signal of a corresponding one of the chirps 306-1 through 306-N. For example, the living-object detector 222-1 applies the Fourier transform 520-1 to the receiver signal of the first chirp 306-1, the living-object detector 222-1 applies the Fourier transform 520-2 to the receiver signal of the second chirp 306-2, and so forth. In each frame M, the living-object detector 222-1 uses a respective one of the Fourier transforms 520 for the receiver signal of each of the N chirps 306.

After applying a respective one of the Fourier transforms 520 to the respective receiver signal of each of the N chirps 306, a non-coherent integrator 522 of the living-object detector 222-1 integrates, using non-coherent integration, each result of the Fourier transforms 520 to determine a respective amplitude, as a function of range, associated with each of the N chirps 306, as integrated over a sequence of M frames 308. The non-coherent integrator 522 outputs non-coherent integration (NCI) results 524, which each indicate a respective amplitude, as a function of range, for each of the N chirps 306, over M frames 308. The results 524 can represent amplitude/range graphs as shown in FIG. 4-1.

A statistical detector 526 of the living-object detector 222-1 applies a statistical operation, such as standard deviation, to the NCI results 524 to determine a standard deviation of amplitude, as a function of range, for the M frames 308. For example, the statistical detector 526 outputs the standard deviation 400 in response to receiving the results 524 determined from the radar signals 112-2 through 112-6.

In response to the standard deviation satisfying a threshold, the living-object detector 222-1 outputs a detection alert 528. The processing unit 212 is configured to output the indication of the passenger of the vehicle 100 to an alert system (e.g., a mobile phone) that is configured to output an alert about the passenger of the vehicle.

Instead of applying the Fourier transform on a chirp by chirp basis as is done by the living-object detector 222-1, the living-object detector 222-2 in FIG. 5-3, when executed by the processing unit 212, configures the radar system 102 to apply the Fourier transform at a frame-level. The Fourier transform is applied to a common receiver signal for each frame 308. The common receiver signal is representative of the receiver signal of some or all the chirps 306 in each frame 308.

For example, the processing unit 212 determines the common receiver signal for the multiple chirps 306 in each frame 308 by averaging the respective receiver signals of the multiple chirps 306 in that frame 308. The processing unit 212 may instead determine the common receiver signal for the multiple chirps 306 in each frame 308 by summing the respective receiver signals of the multiple chirps 306 in that frame 308.

In response to the standard deviation satisfying a threshold, the living-object detector 222-2 outputs a detection alert 528. For example, the processing unit 212 outputs the indication of the passenger of the vehicle 100 to an emergency alert system or car alarm that is configured to output an alert about the passenger in an unattended vehicle.

The common receiver signal may be determined using all the chirps 306 in a frame 308. In other instances, only some of the chirps 306 are used to determine the common receiver signal. One or more of the radar signals 112-2 through 112-6 may be corrupted or redundant to another one of the radar signals 112-2 through 112-6 and therefore, may be excluded from the common receiver signal determination.

FIG. 5-4 illustrates examples of a standard deviation in an amplitude of radar reflections, as a function of range, determined by the living-object detectors of FIG. 5-2 and FIG. 5-3, in contrast to a standard deviation in an amplitude of a conventional radar system. FIG. 5-4 shows a SNR of a conventional radar system that uses a typical chirp pattern with individual chirps separated by long idle periods, relative to a SNR of the radar system 102 which uses an atypical (multiple) chirp pattern, given different N quantities of chirps, over M quantity of frames, where M equals fifty. When five chirps are used, the SNR improvement over a conventional radar system is about six decibels. Using ten chirps per frame improves the SNR by ten decibels over the conventional radar system. Finally, if the radar system 102 uses thirty chirps over one of fifty frames, the SNR improvement will be just under fifteen decibels.

Figures 1, 6:
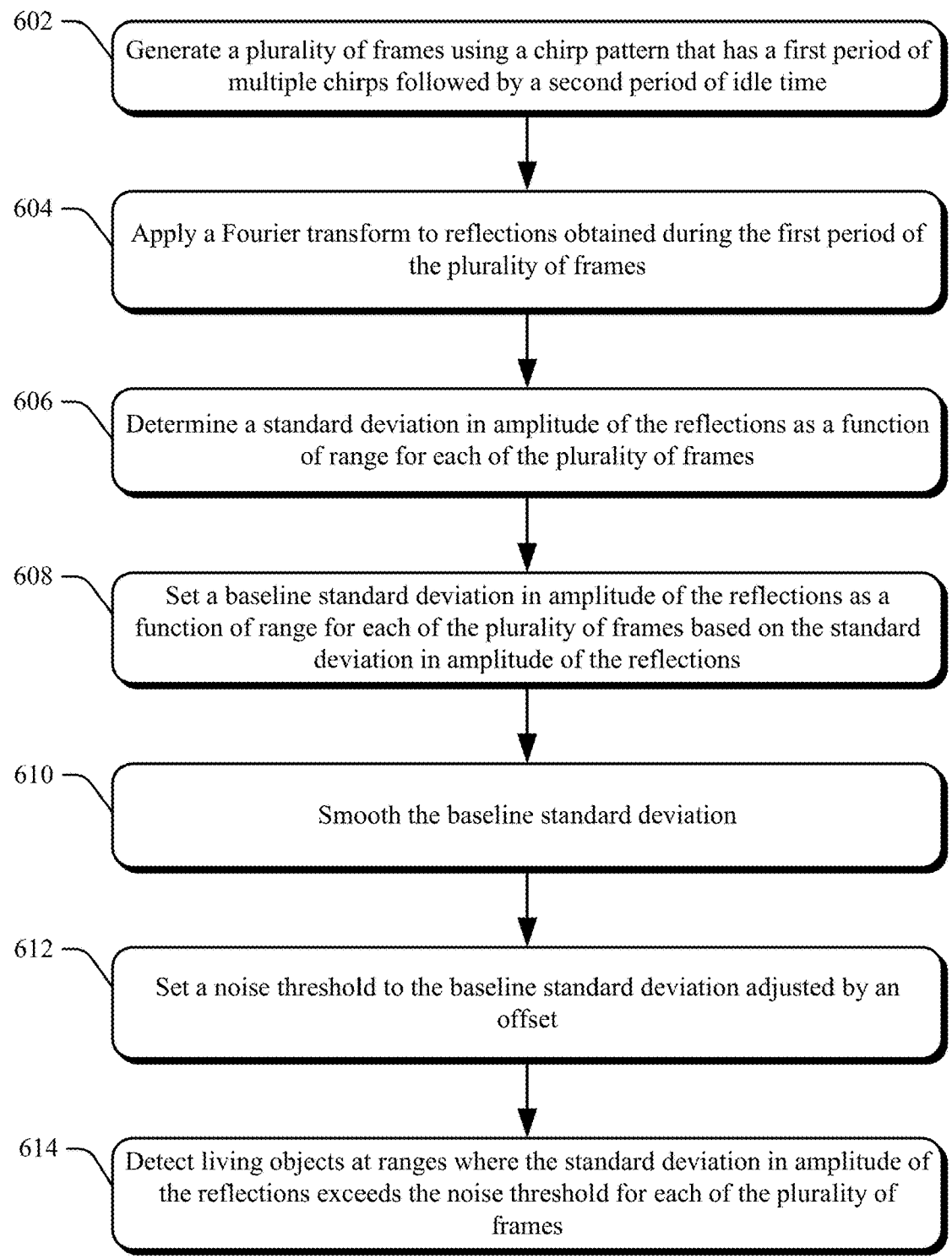
Figure 6:
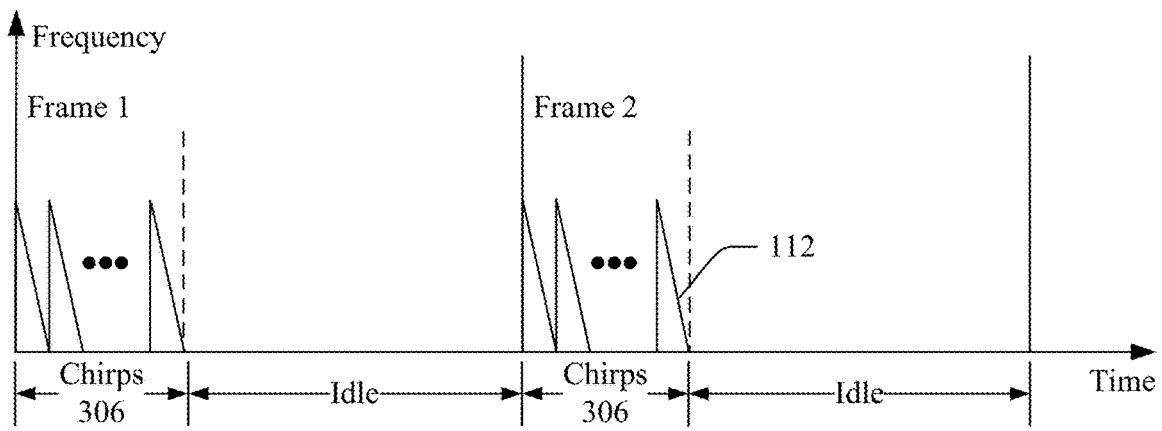
Figure 2:
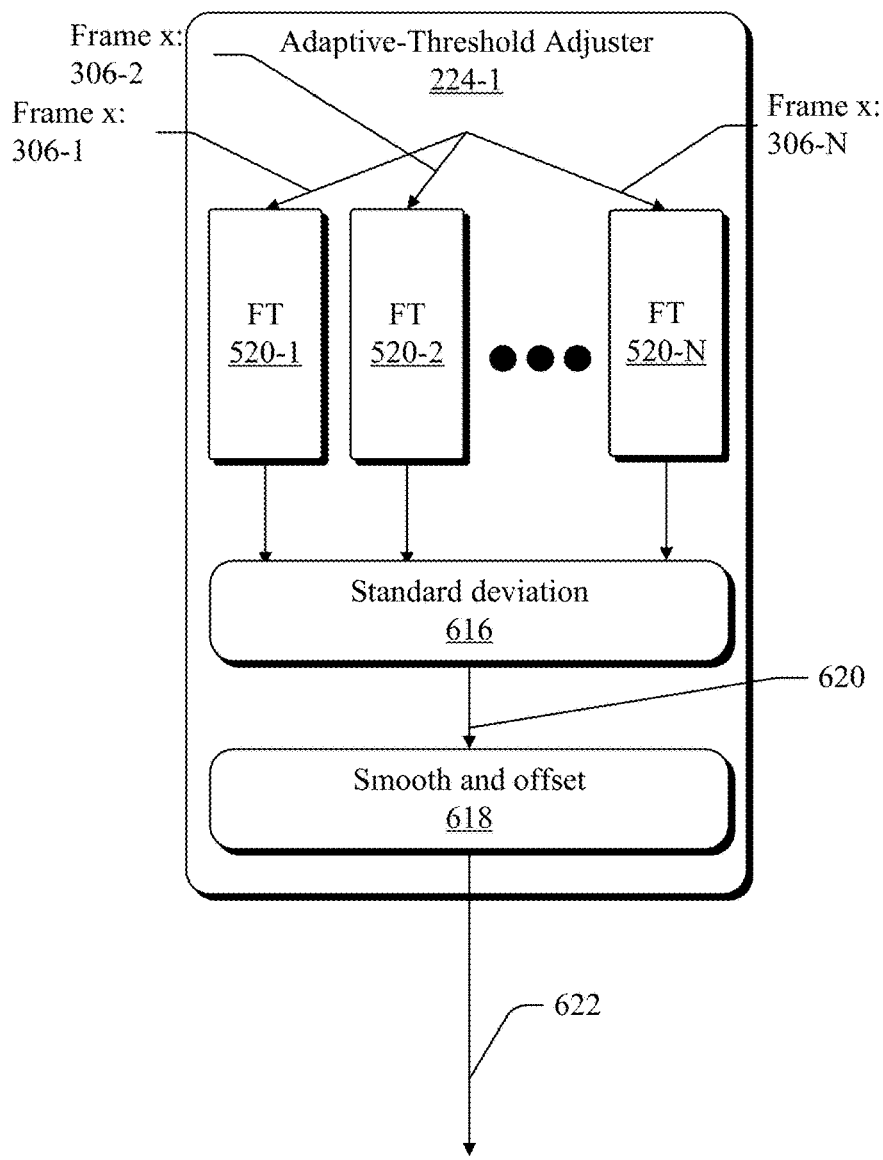
Figure 6:
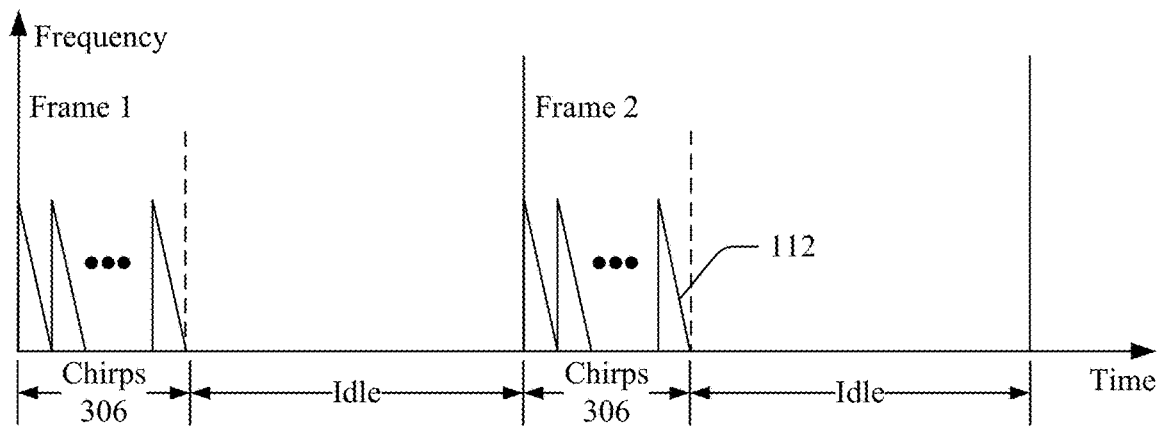
Figure 3:
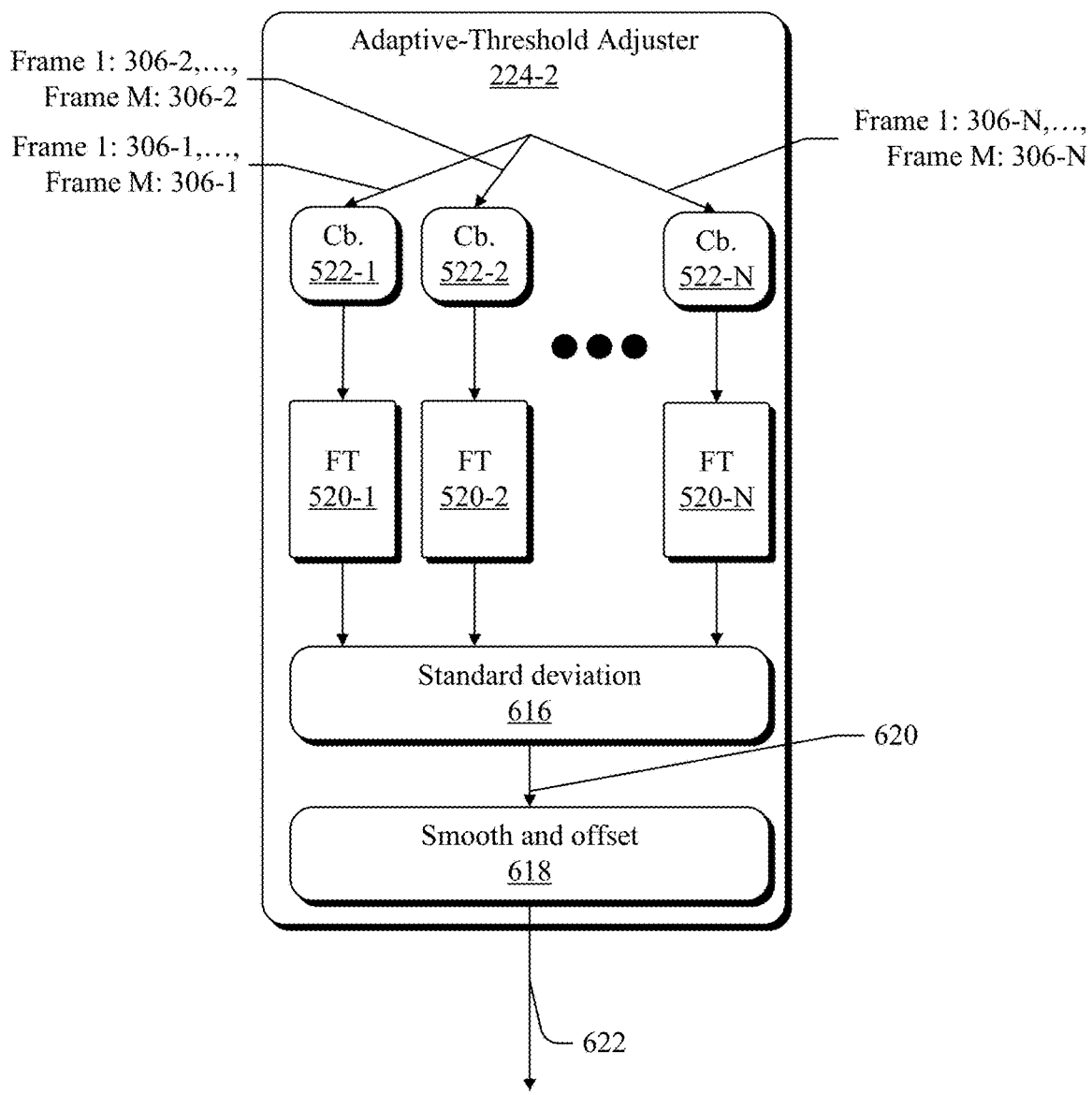
Figures 4, 6:
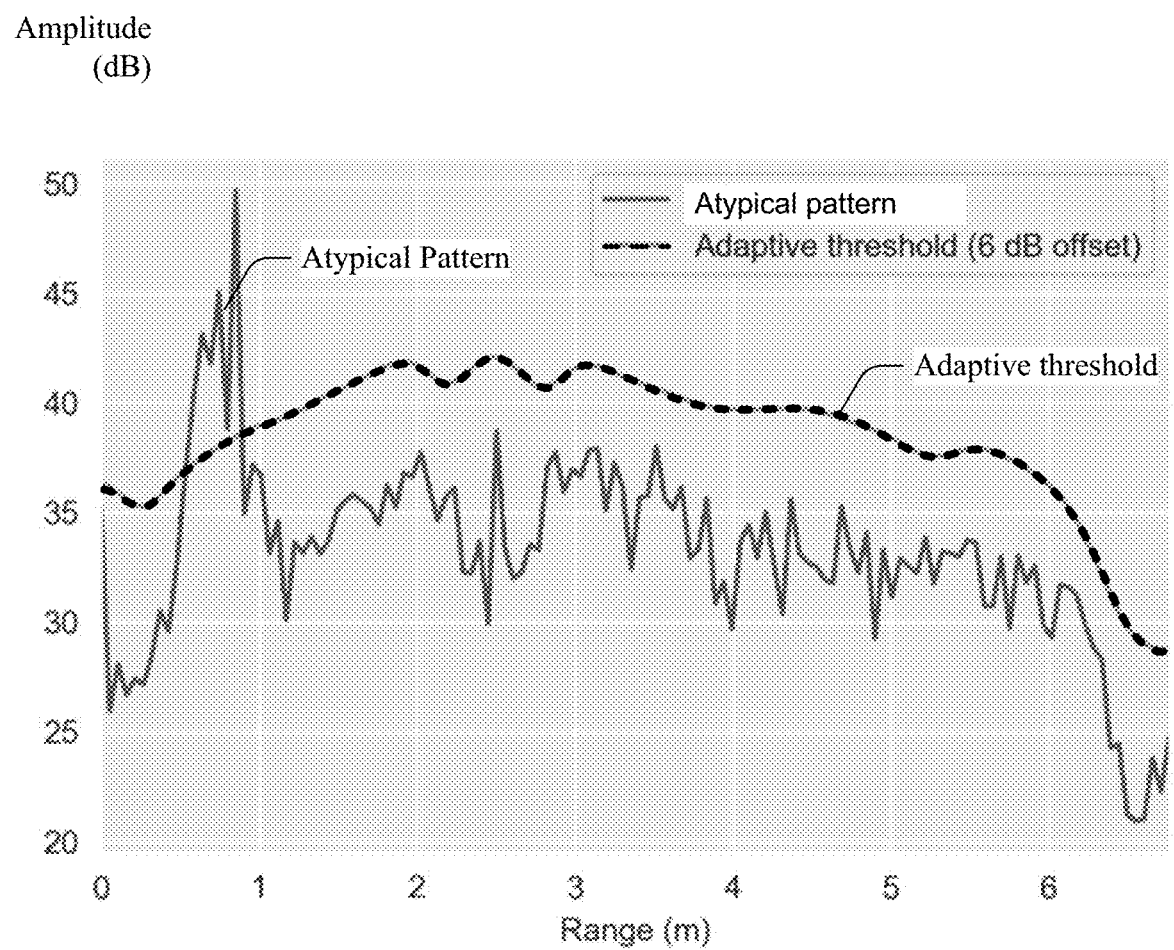

FIG. 6-1 illustrates example operations performed by an FMCW radar system, such as the radar system 102. The processing unit 212 may configure the radar system 102 to perform operations 602 through 614 by executing instructions associated with the radar control module 220, the living-object detector 222, or the adaptive-threshold adjuster 224. The operations 602 through 614 may be repeated, combined, or reorganized to provide other operations, without necessarily being limited to the order and combination shown in FIG. 6-1.

To distinguish a living object 108 from noise, such as thermal noise from the radar system 102 itself or environmental noise of the vehicle 100, the radar system 102 uses a noise threshold to determine if the standard deviation of the amplitude of the radar signal 112, as a function of time, is strong enough to trigger an output of an indication of a live object 108. Said differently, the noise threshold prevents false triggers to detections or detections with low-amplitude, which improves accuracy of the radar system 102.

In some examples, the noise threshold can be set to a predetermined value based on a predefined set of radar characteristics. A predetermined threshold is application dependent and is set to a value that makes the living objects detectable when a standard deviation in amplitude, peaks above expected noise levels. Rather than a predetermined threshold, the radar system 102 uses an adaptive threshold, which is set by performing the operations 602 through 614.

In summary, the adaptive threshold is determined initially when the radar system 102 powers-on, powers-up, or otherwise starts to operate. The adaptive threshold can also be updated periodically, randomly, or otherwise as needed, anytime the radar system 102 performs the operations 602 through 614. To calculate the threshold, the radar transmits N fast chirps. For each fast chirp, a Fourier transform is used to process the receiver signal associated with the chirp, which is then used to generate a range profile across M frames. The range profile represents a function for determining amplitude of a radar receive signal, as a function of range. The standard deviation in amplitude of the range profiles generated for the M frames is determined. The adaptive threshold, as a function of range, is obtained after adding an offset and smoothing the standard deviation from the previous frames 1 through (M−1) to a current frame M.

At 602, the radar system 102 generates a plurality of frames using a chirp pattern that has a first period of multiple chirps followed by a second period of idle time. For example, the radar signal 112, including the chirps 306, is generated for a plurality of frames 308 (e.g., Frame 1 to frame M). At 604, the radar system 102 applies a Fourier transform to radar reflections obtained during the first period within each of the plurality of frames. The radar system applies the Fourier transform to a respective receiver signal of each of the chirps 306. The radar system 102 may instead apply the Fourier transform, collectively, to the chirps 306 by applying the Fourier transform to a combined (e.g., averaged, summed) receiver signal for each different chirp 306, over multiple frames 308.

At 606, the radar system 102 determines a respective amplitude, as a function of range, for each of the plurality of frames. At 608, the radar system 102 determines a baseline standard deviation in the respective amplitude of at least two of the plurality of frames. For example, the processing unit 212 is configured to determine a baseline standard deviation to be used for Frame 4, based on a standard deviation in amplitude for Frames 1 through 3. The baseline standard deviation in amplitude, as a function of range, for a current frame is set to the standard deviation in amplitude, as a function of range, of a plurality of prior frames.

At 610, before adding an offset to the baseline standard deviation, the radar system 102 smooths the baseline standard deviation for the at least two frames. At 612, after smoothing the baseline standard deviation, the radar system 102 determines the adaptive noise threshold by applying an offset to the baseline standard deviation. In other words, the processing unit 212 is configured to determine the adaptive noise threshold for a third frame by smoothing the baseline standard deviation for a prior first and second frame. Adjusting the adaptive noise threshold in this way enables accurate detections despite a dynamic and noisy environment.

For example, the adaptive-threshold adjuster 224 may increase the baseline standard deviation by an offset. Based on the increased baseline standard deviation, a standard deviation for another plurality of frames is determined and smoothed by the adaptive-threshold adjuster 224. This way, the adaptive-threshold adjuster 224 updates the adaptive noise threshold by setting the adaptive noise threshold to the smoothed, baseline standard deviation. Responsive to a standard deviation for subsequent frames satisfying the adaptive noise threshold, the radar system 102 outputs an indication of a living object 108 detected during the subsequent frames.

At 614, the radar system detects living objects at ranges where a standard deviation in amplitude among received radar reflections peaks above the noise threshold. For example, the processing unit 212 is configured to direct a transceiver (e.g., the transceiver 210) to generate a fast-N chirp pattern across a plurality of M frames. Based in part on the current standard deviation and a respective amplitude as a function of range for a subsequent frame, the processing unit 212 determines a new, updated standard deviation for the M frames. In response to the new standard deviation not satisfying the noise threshold, the processing unit 212 directs the radar system 102 to refrain from outputting the indication of the object. Alternatively, in response to the new standard deviation satisfying the noise threshold, the processing unit 212 directs the radar system 102 to output the indication of the object. For example, in response to detecting a living object 108 in the vehicle 100 while the vehicle 100 is heating or cooling towards an unsafe temperature, the vehicle-based systems 200 turn on a heating and cooling system or open a window to ventilate and keep the vehicle 100 within a safe temperature.

FIGS. 6-2 and 6-3 illustrate different examples of adaptive-threshold adjusters 224 of the radar system 102. Other examples of the adaptive-threshold adjuster 224 are possible including additional or fewer components than those shown in FIGS. 6-2 and 6-3. In either example, the adaptive-threshold adjusters 224-1 and 224-2 each apply a Fourier transform to a respective receiver signal of each chirp from a multiple chirp pattern.

An adaptive-threshold adjuster 224-1, as depicted in FIG. 6-2, applies a Fourier transform 520-1 through 520-N, to the receiver signal of each chirp 306-1 through 306-N in a plurality of M frames. A standard deviation component 616 computes a baseline standard deviation 620 and after smoothing and applying an offset using a smooth and offset component 618, the adaptive-threshold adjuster 224-1 outputs an adaptive threshold 622. For example, the standard deviation component 606 integrates, using non-coherent integration, results of the applying the Fourier transforms 520-1 through 520-N to the respective receiver signal of each chirp from the multiple chirps 306 in each of the plurality of frames 308.

The adaptive threshold 622 is determined as a function of the baseline standard deviation 620 plus an offset to tune the radar system 102 to be more or less susceptible to noise. To determine the adaptive noise threshold 622, an offset may be added to the baseline standard deviation after smoothing the baseline standard deviation.

In FIG. 6-3, an adaptive-threshold adjuster 224-2 applies a Fourier transform 520-1 through 520-N, to a common receiver signal associated with each chirp 306-1 through 306-N. The common receiver signal represents a combination (e.g., average, summation) of the receiver signal for a particular one of the chirps 306, over the plurality of M frames. A combiner 522-1 through 522-N feeds a corresponding one of the Fourier transforms 520-1 through 520-N. For example, with five frames (e.g., M equals five), a combined receiver signal associated with the chirp 306-1 across the five frames is determined by averaging or summing the receiver signal of the chirp 306-1 for Frame 1, with the chirp 306-1 for Frame 2, . . . , and with the chirp 306-1 for Frame M.

A standard deviation component 616 computes a baseline standard deviation 620 based on the outputs from the Fourier transforms 520-1 through 520-N. The baseline standard deviation 620 is smoothed and an offset is applied using a smooth and offset component 618. The adaptive-threshold adjuster 224-2 outputs an adaptive threshold 622. The adaptive threshold 622 is determined as a function of the baseline standard deviation 620 plus an offset to tune the radar system 102 to be more or less susceptible to noise. To determine the adaptive threshold 622, an offset may be added to the baseline standard deviation after smoothing the baseline standard deviation.

FIG. 6-4 illustrates an example adaptive threshold during part of a frame generated by an FMCW radar system that uses the example adaptive-threshold adjusters of FIG. 6-2 or FIG. 6-3. As shown in FIG. 6-4, the adaptive threshold is able to follow the noise response of the radar system 102 and make the signature from the living object 108 readily detectable.

The adaptive-threshold adjuster 224 computes an adaptive noise threshold by adding an offset to a baseline standard deviation for a prior plurality of frames, after smoothing the baseline standard deviation. Based on the baseline standard deviation, a current standard deviation for a current plurality of frames (e.g., including the prior plurality of frames) is determined and smoothed by the adaptive-threshold adjuster 224. This way, the adaptive-threshold adjuster 224 updates the adaptive-noise threshold by setting the adaptive-noise threshold for a plurality of frames generated using the chirp pattern to the smoothed standard deviation for a prior plurality of frames. Responsive to a standard deviation for the plurality of frames generated using the chirp pattern satisfying the adaptive noise threshold, the radar system 102 outputs an indication of a living object 108 detected during the plurality of frames.

Figures 1, 7:
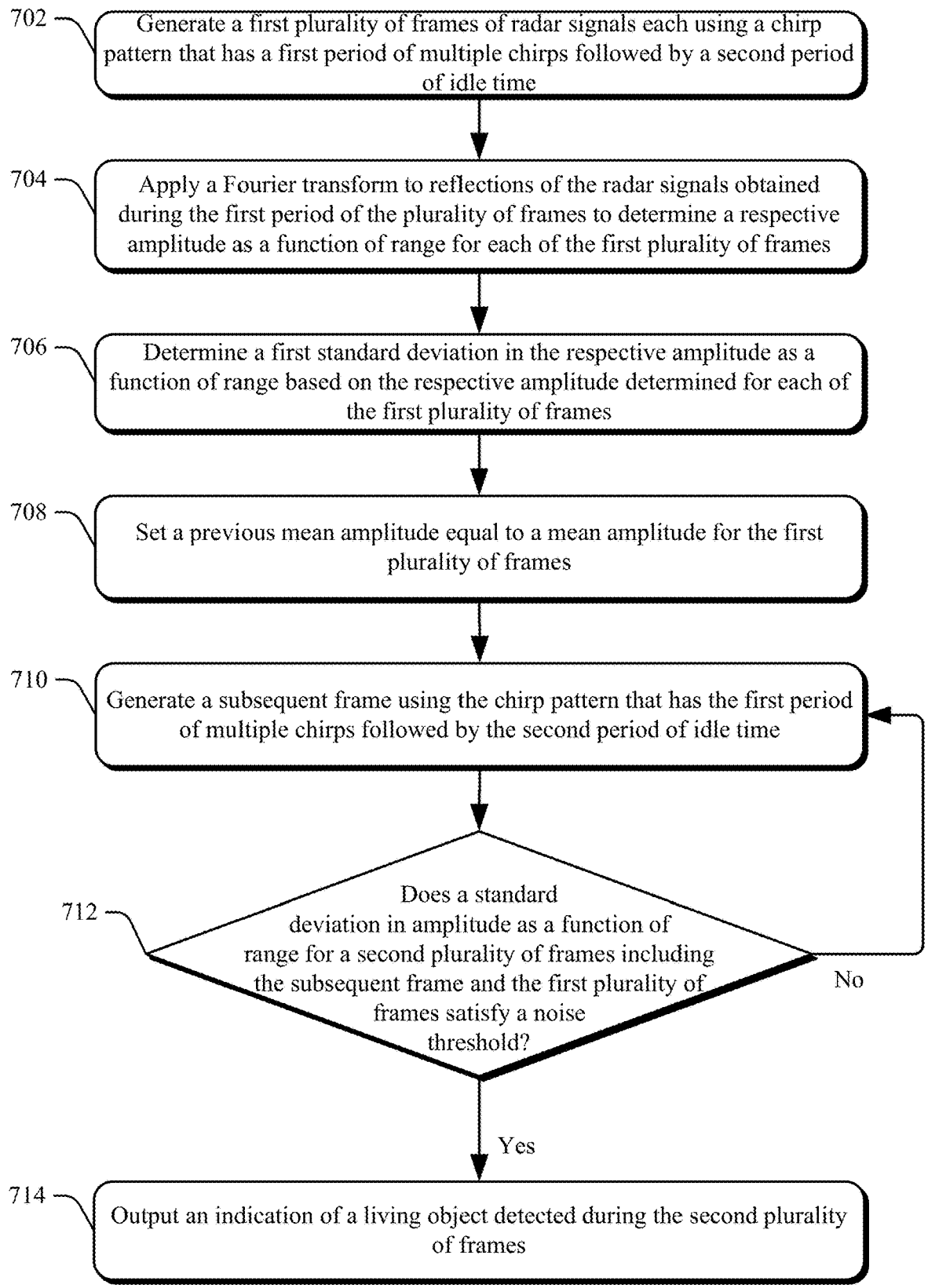
Figures 2, 7:
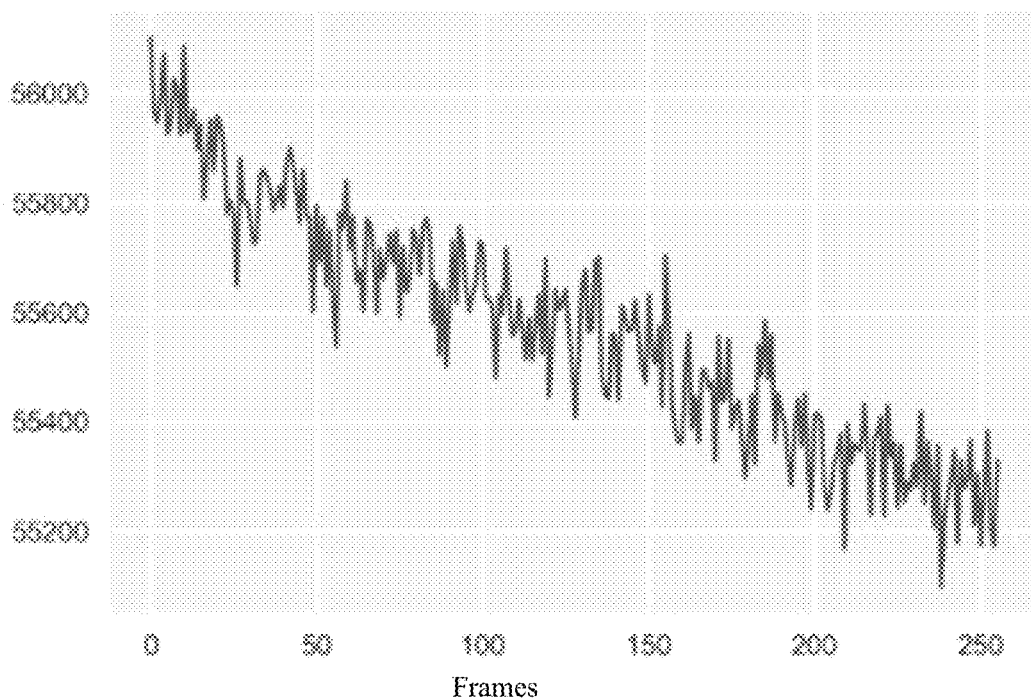
Figures 3, 7:
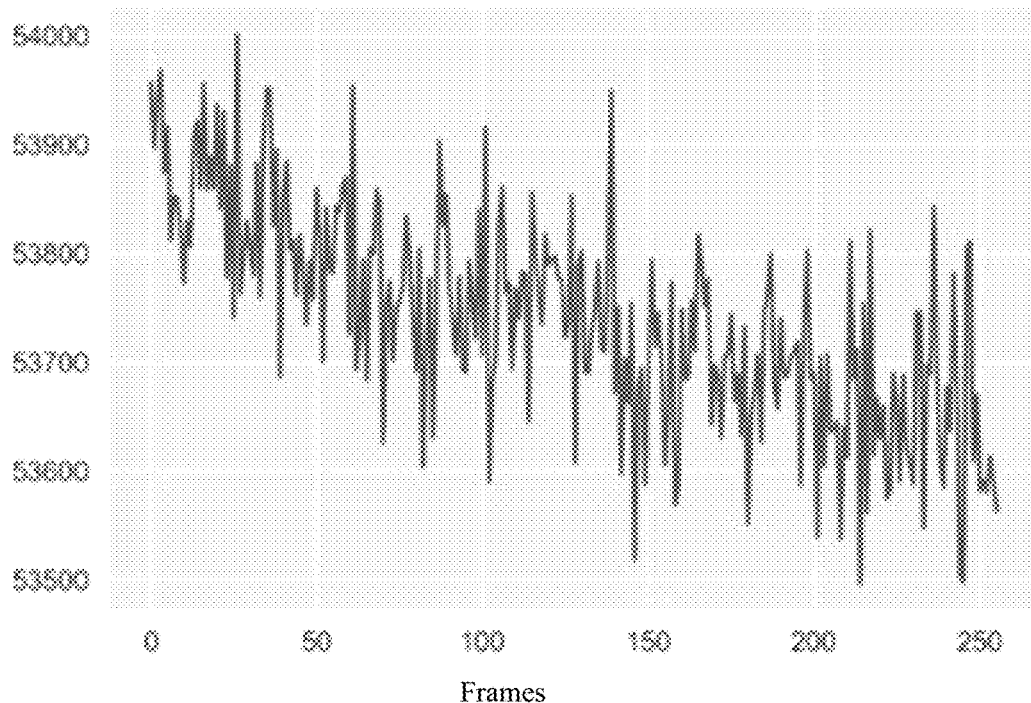
Figures 4, 7:
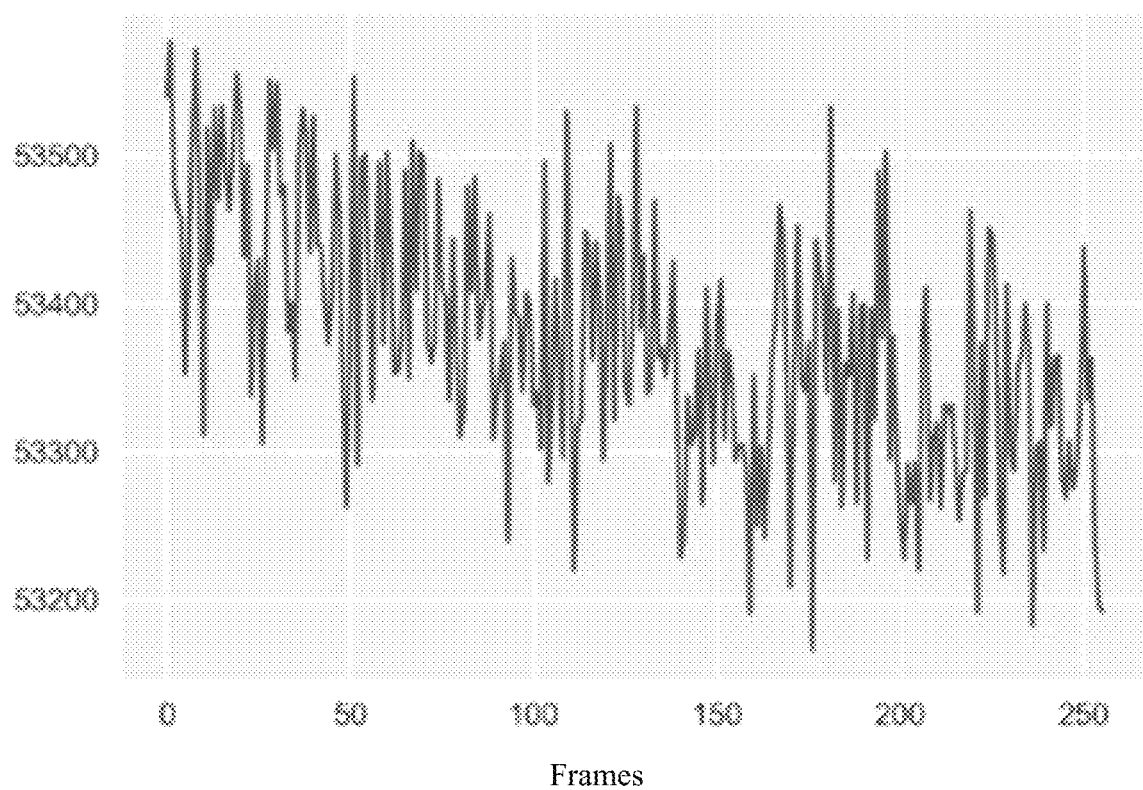
Figures 5, 7:
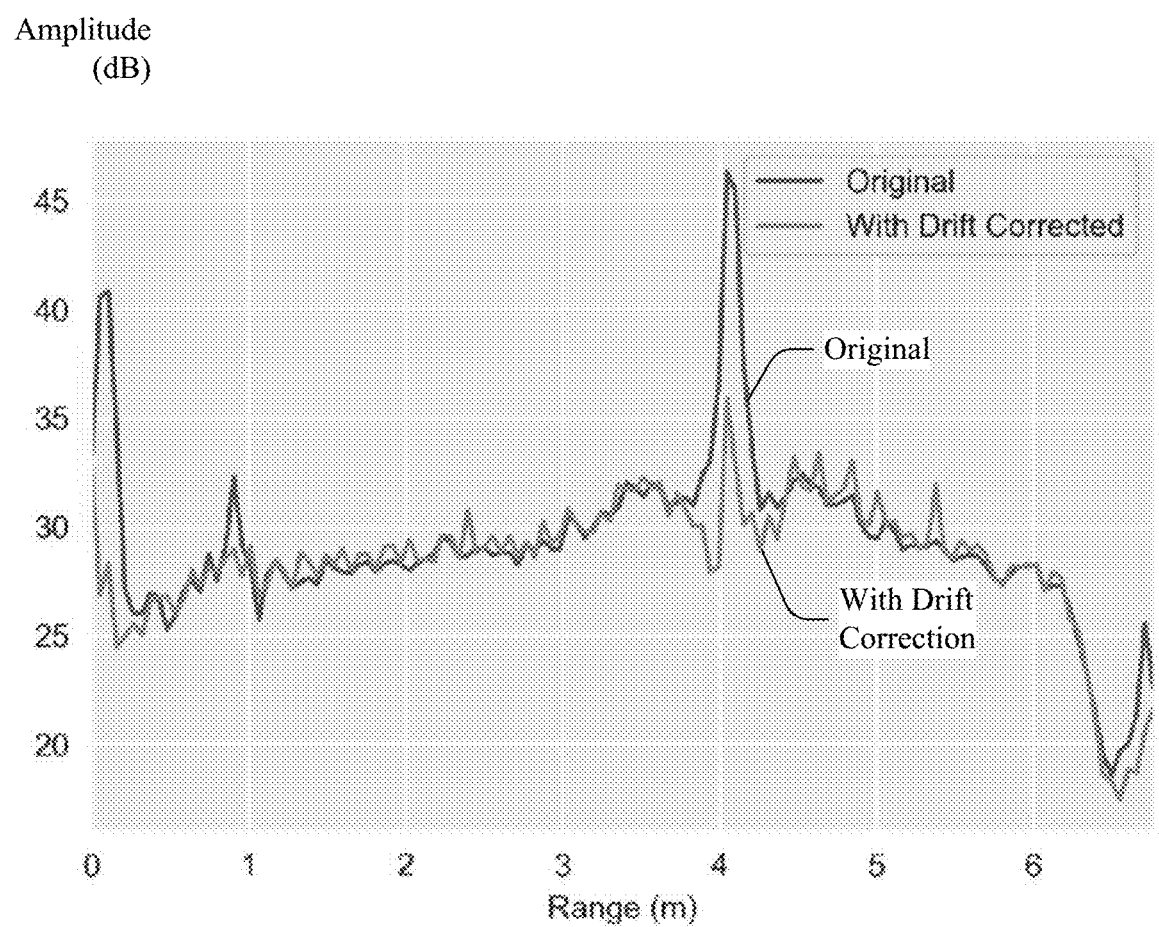

FIG. 7-1 illustrates example operations performed by an FMCW radar system, such as the radar system 102. The processing unit 212 may configure the radar system 102 to perform operations 702 through 716 by executing instructions associated with the radar control module 220, the living-object detector 222, or the adaptive-threshold adjuster 224. The operations 702 through 716 may be repeated, combined, or reorganized to provide other operations, without necessarily being limited to the order and combination shown in FIG. 7-1.

When performed by the radar system 102, the operations 702 through 716 configure the radar system 102 to incrementally compute a standard deviation in amplitude, as a function of range, associated with multiple chirps 306 and over multiple frames 308. To calculate the standard deviation of multiple measurements, a conventional radar system waits until sufficient radar data has been collected from the transceiver(s) before performing the calculation. This conventional way requires a large memory to store all the radar data and ultimately increases an amount of time (response time) to detect living targets. Rather than wait to calculate the standard deviation, the radar system 102 performs operations 702 through 716 to incrementally update, e.g., at the end of each frame 308, mean amplitude μ and standard deviation in amplitude σ calculations.

The standard equation for calculating an arithmetic mean μ is by using Equation 1, where n is the total number of samples, $x_i$ is one particular sample in a quantity of i samples:

$$\mu = \frac{1}{n}\sum_{i=1}^{n} x_i \qquad \text{Equation 1}$$

Each sample $x_i$ represents an amplitude of a radar receive signal or radar reflection, as a function of range, for a particular chirp or group of chirps, in a frame. A conventional radar collects and stores all the samples $x_i$ before calculating the mean μ amplitude as a function of range, according to the Equation 1, which requires a processing unit to have access to a large memory if the quantity i of the samples $x_i$ is large. In addition, the computation may experience an overflow condition during summation if the quantity i of the samples $x_i$ sums to a value that is too great for the processing unit to handle.

The radar system 102 performs operations 702 through 716 to perform an incremental mean and standard deviation calculation based on an incremental mean $\mu_n$ computation expressed as Equation 2. The Equation 2 is based on the Equation 1, but rewritten as follows:

$$\mu_n = \mu_{n-1} + \frac{x_n - \mu_{n-1}}{n} \qquad \text{Equation 2}$$

Each new or updated mean $\mu_n$ is set to the old or current mean $\mu_{n-1}$ but adjusted by a fraction 1/n of the difference between the current sample $x_n$ and the current mean $\mu_{n-1}$. Equation 2 provides a more stable computation than Equation 1 because Equation 2 avoids the accumulation of large sums.

Below is Equation 3, which is the equation a conventional radar system uses to calculate the standard deviation σ:

$$\sigma = \sqrt{\frac{1}{n}\sum_{i=1}^{i=n}(x_i - \mu)^2} \qquad \text{Equation 3}$$

In a simple implementation, a conventional radar system performs two passes over accumulated radar data to compute the standard deviation σ derived from the Equation 3. During the first pass, the conventional radar system calculates the mean μ for all the samples $x_i$. Then, during a second pass, the radar system sums the square of the distances from each of the samples $x_i$ to the mean μ.

After some rearrangement, the calculation of the standard deviation σ in the Equation 3 can be rewritten as Equation 4, which follows as:

$$\sigma^2 = \frac{1}{n}\sum_{i=1}^{i=n} x_i^2 - \left(\frac{1}{n}\sum_{i=1}^{i=n} x_i\right)^2 \qquad \text{Equation 4}$$

Computing the standard deviation σ according to the Equation 4 requires all the samples $x_i$ to be already collected and stored. Secondly, the Equation 4 is dependent on the arithmetic mean μ calculation (Equation 1), which has overflow precision issues with large sample sizes (e.g., in implementations where i is a large integer). These two issues are resolved through use of an incrementally updated variance formula $S_n$, as explained below.

As shown below in Equation 5, the radar system 102 incrementally updates the variance $S_n$ by assuming:

$$S_n = \sigma^2 n \qquad \text{Equation 5}$$

When combined with the Equation 2, the variance $S_n$ from the Equation 5 can be re-written as shown below in Equation 6:

$$\sigma^2 = \sum_{i=1}^{i=n} x_i^2 - n\mu_n^2 \qquad \text{Equation 6}$$

After further derivation, the Equations 5 and 6 can be reduced to Equation 7, the variance $S_n$:

$$S_n = S_{n-1} + (x_n - \mu_{n-1})(x_n - \mu_n) \qquad \text{Equation 7}$$

The variance $S_n$ from the Equation 7 leads to the incremental standard deviation $\sigma$, as shown in the Equation 8:

$$\sigma = \sqrt{\frac{S_n}{n}} \qquad \text{Equation 8}$$

Computing the Equations 7 and 8 does not require the radar system 102 to maintain a cumulative sum for all the frames, nor does the radar system 102 suffer from the potential overflow issues that a conventional radar system can experience by computing the standard deviation $\sigma$ strictly following the Equation 3.

The radar system 102 need not store any of the samples x for the final calculation. Instead, the radar system 102 can simply store a previous variance $S_{n-1}$ value and continuously update the previously stored variance value $S_{n-1}$ to compute the standard deviation $\sigma$ according to the Equation 8, as the radar system 102 receives new samples $x_n$. Given the above derivation, the radar system 102 executes the operations 702 through 714 to update the standard deviation incrementally with each new sample $x_n$ based on the principles of the Equation 8.

At 702, the processing unit 212 of the radar system 102 directs a transceiver 210 to detect living objects by generating a first plurality of frames 1 through (n−1), using a chirp pattern that has a first period of multiple chirps followed by a second period of idle time. At 704, the processing unit 212 applies a Fourier transform, such as a FFT, to radar reflections obtained during the first period within each of the first plurality of frames to determine a respective amplitude, as a function of range, for each of the first plurality of frames.

At 706, the processing unit 212 determines a first standard deviation $\sigma_{n-1}$ in amplitude as a function of range based on the respective amplitude determined for each of the first plurality of frames. In computing the first standard deviation, the processing unit computes a mean amplitude. The processing unit 212 sets and stores, at 708, a previous mean amplitude $\mu_{n-1}$ to a value equal to a mean amplitude $\mu_{n-1}$ for the first plurality of frames.

Then, at 710, the processing unit 212 directs the transceiver 210 to detect living objects by generating a subsequent frame n using the same chirp pattern used at 702. The processing unit 212 applies a Fourier transform to radar reflections obtained during the subsequent frame to determine an amplitude as a function of range of the receiver signal for the subsequent frame.

The processing unit 212 determines a current mean $\mu_n$ equal to the previous mean $\mu_{n-1}$ incremented by a fraction of the amplitude $x_n$ for the subsequent frame n, per the Equation 2. The fraction of the amplitude $x_n$ of the subsequent frame n is equal to a difference between the amplitude $x_n$ of the subsequent frame n and the previous mean $\mu_{n-1}$, the difference being divided by a total quantity of frames n among the plurality of frames 1 through n.

A standard deviation $\sigma_n$ of the plurality of frames and the subsequent frame is determined by incrementing the standard deviation $\sigma_{n-1}$ by a function of the range $x_n$ of the subsequent frame n, the previous mean $\mu_{n-1}$ and the current mean $\mu_n$. For example, the function of the range $x_n$ of the subsequent frame n, the previous mean $\mu_{n-1}$ and the current mean $\mu_n$ is based on a product of the amplitude of the subsequent frame minus the previous mean and the amplitude of the subsequent frame minus the current mean (see the Equation 7 which controls the results of the Equation 8).

At 712, the radar system determines whether the standard deviation in the amplitude $\sigma_n$ satisfies a noise threshold. Responsive to the standard deviation $\sigma_{n-1}$ satisfying a noise threshold at 712, the processing unit 212 outputs, at 714, an indication of a living object 108 detected during the plurality of frames 1 through n. Otherwise, in response to the standard deviation $\sigma_{n-1}$ not satisfying the noise threshold at 712, the processing unit 212 returns to the operation 710 for generating additional frames to detect a living object 108.

Each time the radar system 102 computes a current mean $\mu_n$ the radar system 102 later stores the current mean $\mu_n$ as the previous mean $\mu_n$ to be used during calculation of a subsequent mean $\mu_{n+1}$. For example, the living-object detector 222 uses the previous mean $\mu_{n-1}$ to determine a current mean $\mu_n$ and stores the current mean $\mu_n$ as the previous mean $\mu_{n-1}$ in a memory of the computer-readable storage media 214 or storage media otherwise accessible to the processing unit 212.

The operations 710 and 712 may be repeated until a living object 108 is detected, or based on some other criteria (e.g., quantity of frames, duration of time). For example, after generating another plurality of frames (n+1), the processing unit 212 determines the current mean $\mu_{n+1}$. The current mean $\mu_{n+1}$ is equal to the previous mean $\mu_n$ incremented by a fraction of an amplitude $x_{n+1}$ of a current plurality of frames as a function of range. The fraction of the amplitude $x_{n+1}$ is equal to a difference between the amplitude $x_{n+1}$ of the new frame and the previous mean $\mu_n$, the difference being divided by a total quantity (n+1) of frames.

A standard deviation $\sigma_{n+1}$ of the plurality of frames (n+1) is determined by incrementing the standard deviation $\sigma_n$ by a function of the amplitude $x_{n+1}$ of the plurality of frames n+1, the previous mean $\mu_n$, and the current mean $\mu_{n+1}$. At 712, the radar system determines whether the standard deviation $\sigma_{n+1}$ satisfies the noise threshold, which may be an adaptive threshold. Responsive to the standard deviation $\sigma_{n+1}$ satisfying the noise threshold at 712, the processing unit 212 outputs, at 714, an indication of the living object 108 detected during the plurality of frames 1 through n+1.

Otherwise, in response to the standard deviation $\sigma_{n+1}$ not satisfying the noise threshold at 712, the processing unit 212 stores the current mean $\mu_{n+1}$ as the previous mean $\mu_{n+1}$ and returns to the operation 710 for generating additional frames to detect a living object 108. In response to the standard deviation $\sigma_{n+1}$ not satisfying the noise threshold at 712, the processing unit 212 refrains from outputting an indication of a living object.

FIGS. 7-2 through 7-4 illustrate an example of power drift in an FMCW radar system. For responsive and quick detection of living targets, the radar system 102 processes radar data as soon as the radar system 102 powers on. However, it is common that the components of the radar system 102 (e.g., which may be made of Silicon) need a period of time after the radar system 102 powers on, before the components are stable. An example of power drift is shown in the sequence of FIGS. 7-2 through 7-4. The radar system 102 takes more than four minutes, for example, to report a correct and stable amplitude x of radar reflections as a function of range. Power drifting may introduce a false trigger to a detection of a living target by introducing errors in the calculation of the standard deviation σ.

The radar system 102 may prevent false triggers to detections by correcting for a slope k of the power drifting. Where $x_n$ is the last sample and $x_1$ is the first sample, the radar system 102 obtains the slope k of the samples by calculating Equation 9 as follows:

$$k = \frac{x_n - x_1}{n - 1} \quad \text{Equation 9}$$

To determine the standard deviation σ and/or the mean $\mu_n$ amplitude as a function of range, the radar system 102 compensates for false triggers to detections, based on the slope k of the samples x. To improve performance, the radar system 102 may incrementally compensate for the false triggers to detections resulting from the power drift.

FIG. 7-5 illustrates an example adaptive threshold during part of a frame generated by an FMCW radar system that corrects for power drift. FIG. 7-5 shows the effects of drift correction on an original signal; the false peak is substantially reduced after using drift correction. The original signal can represent a return from a living object. Similarly, an adaptive threshold that follows the noise response of the radar system 102 can benefit from drift correction to make the living object 108 readily detectable.

To put the slope correction into the incremental mean and standard deviation calculations of the Equations 7 and 8, a new mean $m_n$ is defined in Equations 10 through 13:

$$m_n = \frac{1}{n}\sum_{i=1}^{n}(x_i - ik) = \mu_n - \frac{k}{n}\sum_{i=1}^{n} i \quad \text{Equation 10}$$

$$I_n = \frac{1}{n}\sum_{i=1}^{n} i \quad \text{Equation 11}$$

$$I_n = 1 + I_{n-1}\frac{n-1}{n} \quad \text{Equation 12}$$

$$m_n = \mu_n - kI_n \quad \text{Equation 13}$$

Because both $\mu_n$ and $I_n$ can be calculated incrementally, $m_n$ can also been calculated incrementally. Adding slope correction into the Equations 4 and 5 produces an Equation 14 for computing a new variance v with slope correction:

$$v^2 = \frac{1}{n}\sum_{i=1}^{n}((x_i - ik) - m_n)^2 \quad \text{Equation 14}$$

The Equation 14 can be reduced to Equations 15 through 19. Based on the Equations 15 through 19, the Equation 14 for the new variance v can be rewritten into Equation 20, which enables incremental computation of the standard deviation σ including compensating for power drift.

$$v^2 = \sigma^2 + \frac{2kI_n}{n} \quad \text{Equation 15}$$

$$\sum_{i=1}^{n}((x_i - \mu_n) + k^2 I_n^2 + \frac{k^2}{n}\sum_{i=1}^{n} i^2 + 2m_n kI_n - \frac{2k^2}{n}\sum_{i=1}^{n} ix_i$$

$$A_n = \frac{1}{n}\sum_{i=1}^{n} i^2 \quad \text{Equation 16}$$

$$B_n = \frac{1}{n}\sum_{i=1}^{n} ix_i \quad \text{Equation 17}$$

$$A_n = \frac{(n-1)A_{n-1}}{n} + n \quad \text{Equation 18}$$

$$B_n = \frac{(n-1)B_{n-1}}{n} + x_n \quad \text{Equation 19}$$

$$v_n^2 = \frac{S_n}{n} - 2kB_n + 2k\mu_n I_n - k^2 I_n^2 + k^2 A_n \quad \text{Equation 20}$$

Because $S_n$, $A_n$, $B_n$, $I_n$, and $\mu_n$ can be calculated incrementally, the Equation 20 and the new variance $V^2$ can also be calculated incrementally. Computing the standard deviation from computing variance in this way significantly reduces memory requirements. With incremental calculation and slope correction, the radar system 102 detects living targets without potential for overflow or false triggers to detections.

The following are additional examples of radar-based detection of living objects.

Example 1. A radar system comprising: an antenna array; a transceiver configured to generate radar signals via the antenna array; and a processing unit configured to: direct the transceiver to generate, for a plurality of frames, the radar signals having a chirp pattern that has a first period of multiple chirps followed by a second period of idle time; apply a Fourier transform to respective reflections of the radar signals obtained during each of the plurality of frames to determine a respective amplitude of the reflections as a function of range for each of the plurality of frames; based on the respective amplitude of the reflections for each of the plurality of frames, determine a standard deviation in the respective amplitude for the reflections within each of the plurality of frames; and in response to the standard deviation in the respective amplitude for any of the reflections within the plurality of frames satisfying a noise threshold, output, an indication of a living object detected during the plurality of frames.

Example 2. The radar system of any of the preceding examples, wherein the processing unit is configured to determine the respective amplitude of the reflections as a function of range for each of the plurality of frames by applying the Fourier transform to a respective receiver signal of each of the multiple chirps in each frame, the respective receiver signal of each of the multiple chirps in each frame including a respective digital beat signal including respective baseband data.

Example 3. The radar system of any of the preceding examples, wherein the processing unit is further configured to determine the respective amplitude of the reflections as a function of range for each of the plurality of frames by integrating, using non-coherent integration, results of the applying the Fourier transform to the respective receiver signal of each chirp of the multiple chirps in each frame over the plurality of frames.

Example 4. The radar system of any of the preceding examples, wherein the processing unit is configured to apply the Fourier transform to the multiple chirps by applying the Fourier transform to a common receiver signal for the multiple chirps in each frame over the plurality of frames.

Example 5. The radar system of any of the preceding examples, wherein the processing unit is configured to determine the common receiver signal for the multiple chirps in each frame by averaging respective receiver signals of each of the multiple chirps in that frame.

Example 6. The radar system of any of the preceding examples, wherein the processing unit is configured to determine the common receiver signal for the multiple chirps in each frame by summing respective receiver signals of each of the multiple chirps in that frame.

Example 7. The radar system of any of the preceding examples, wherein: the radar system is integrated in a vehicle; a field-of-view of the radar system includes one or more areas occupied by passengers of the vehicle; the indication of the living object detected during the plurality of frames is an indication of a passenger of the vehicle; and the processing unit is further configured to output the indication of the passenger of the vehicle to an alert system that is configured to output an alert about the passenger of the vehicle.

Example 8. The radar system of any of the preceding examples, wherein the second period of idle time is longer than the first period of multiple chirps.

Example 9. The radar system of any of the preceding examples, wherein the first period is approximately two or more microseconds and the second period is less than approximately 100 milliseconds.

Example 10. The radar system of any of the preceding examples, wherein the noise threshold is a predetermined threshold based on predetermined characteristics of the radar system.

Example 11. The radar system of any of the preceding examples, wherein the noise threshold is an adaptive noise threshold as a function of range and the processing unit is further configured to adjust the adaptive noise threshold based on a dynamic noise response of the radar system.

Example 12. The radar system of any of the preceding examples, wherein the standard deviation is a current standard deviation, the processing unit is further configured to: determine a baseline standard deviation in amplitude for reflections obtained in at least two prior frames based on a respective amplitude as a function of range for each of the at least two prior frames; and determine the adaptive noise threshold by smoothing the baseline standard deviation and setting the adaptive noise threshold to the baseline standard deviation.

Example 13. The radar system of any of the preceding examples, wherein the processing unit is further configured to add an offset to the baseline standard deviation after smoothing the baseline standard deviation to determine the adaptive noise threshold.

Example 14. The radar system of any of the preceding examples, wherein the standard deviation is a first standard deviation, wherein the processing unit is further configured to: direct the transceiver to generate, for a subsequent frame, the chirp pattern that has the first period of multiple chirps followed by the second period of idle time; determine, based in part on the first standard deviation and a respective amplitude as a function of range for the subsequent frame, a second standard deviation in the respective amplitude for the reflections within the subsequent frame and each of the plurality of frames; and in response to the second standard deviation not satisfying the noise threshold, refrain from outputting the indication of the object.

Example 15. The radar system of any of the preceding examples, wherein the standard deviation is a first standard deviation, wherein the processing unit is further configured to: direct the transceiver to generate, for a subsequent frame, the chirp pattern that has the first period of multiple chirps followed by the second period of idle time; determine, based in part on the first standard deviation and an amplitude as a function of range for the subsequent frame, a second standard deviation as a function of range in the amplitude for the reflections within the subsequent frame and each of the plurality of frames; and in response to the second standard deviation satisfying the noise threshold, output the indication of the object.

Example 16. The radar system of any of the preceding examples, wherein the processing unit is further configured to: determine a previous mean amplitude equal to a mean amplitude for the plurality of frames; determine a current mean amplitude equal to the previous mean amplitude incremented by a fraction of the amplitude of the subsequent frame, the fraction of the amplitude of the subsequent frame being equal to a difference between the range of the subsequent frame and the previous mean, the difference being divided by a total quantity of frames among the plurality of frames and the subsequent frame; and determine the second standard deviation by incrementing the first standard deviation according to a function of the amplitude of the subsequent frame, the previous mean amplitude, and the current mean amplitude.

Example 17. The radar system of any of the preceding examples, wherein the function of the amplitude of the subsequent frame, the previous mean amplitude, and the current mean amplitude computes a product of a first difference between the amplitude of the subsequent frame and the previous mean amplitude and a second difference between the amplitude of the subsequent frame and the current mean amplitude.

Example 18. The radar system of any of the preceding examples, wherein the processing unit is further configured to store the current mean amplitude as the previous mean amplitude for use in subsequently determining a new, current mean in response to a new frame.

Example 19. A computer-readable storage medium comprising instructions that, when executed by a processing unit of a radar system, cause the processing unit to: direct a transceiver of the radar system to generate a plurality of frames of radar signals having a chirp pattern that has a first period of multiple chirps followed by a second period of idle time; apply a Fourier transform to respective reflections obtained during the first period of each of the plurality of frames to determine a respective amplitude of the reflections as a function of range for each of the plurality of frames; based on the respective amplitude of the reflections for each of the plurality of frames, determine a standard deviation in the respective amplitude for the reflections within each of the plurality of frames; and in response to the standard deviation in the respective amplitude for any of the reflections within the plurality of frames satisfying a noise threshold, output, an indication of a living object detected during the plurality of frames.

Example 20. A method comprising: generating, by a radar system, a plurality of frames of radar signals having a chirp pattern that has a first period of multiple chirps followed by a second period of idle time; applying, by the radar system, a Fourier transform to respective reflections obtained during the generating of the first period of each of the plurality of frames to determine a respective amplitude of the reflections as a function of range for each of the plurality of frames; based on the respective amplitude of the reflections for each of the plurality of frames, determining, by the radar system, a standard deviation in the respective amplitude for the reflections within each of the plurality of frames; and in response to the standard deviation in the respective amplitude for any of the reflections within the plurality of frames satisfying a noise threshold, output, an indication of a living object detected during the plurality of frames.

Example 21. A radar system comprising: an antenna array; a transceiver configured to generate radar signals via the antenna array; and a processing unit configured to: direct the transceiver to generate, over a first plurality of frames, the radar signals having a chirp pattern that has a first period of multiple chirps followed by a second period of idle time; determine a respective amplitude as a function of range for the reflections obtained during each of the first plurality of frames; based on the respective amplitude for the reflections obtained during each of the plurality of frames, determine a baseline standard deviation in amplitude as a function of range for the first plurality of frames; adjust an adaptive noise threshold based on a dynamic noise response of the radar system by smoothing the baseline standard deviation for the first plurality of frames and setting the adaptive noise threshold to the baseline standard deviation after the smoothing; and responsive to a standard deviation in amplitude as a function of range for a second plurality of frames generated using the chirp pattern satisfying the adaptive noise threshold, output an indication of a living object detected during the second plurality of frames.

Example 22. The radar system of any of the preceding examples, wherein the processing unit is further configured to add an offset to the baseline standard deviation after smoothing the baseline standard deviation.

Example 23. The radar system of any of the preceding examples, wherein the processing unit is further configured to: smooth the standard deviation for the second plurality of frames; set the adaptive noise threshold for a third plurality of frames generated using the chirp pattern to the smoothed standard deviation for the second plurality of frames; and responsive to a standard deviation in amplitude as a function of range for the third plurality of frames satisfying the adaptive noise threshold set for the third plurality of frames, output an indication of a living object detected during the third plurality of frames.

Example 24. The radar system of any of the preceding examples, wherein the processing unit is further configured to add the offset to the smoothed standard deviation for the second plurality of frames before setting the adaptive noise threshold to the smoothed standard deviation for the second plurality of frames.

Example 25. The radar system of any of the preceding examples, wherein the processing unit is configured to determine the respective amplitude for each of the first plurality of frames by applying a Fourier transform to respective receiver signals of the multiple chirps in each of the first plurality of frames.

Example 26. The radar system of any of the preceding examples, wherein the processing unit is configured to determine the respective amplitude for each of the first plurality of frames by integrating, using non-coherent integration, results of the applying the Fourier transform to the respective receiver signals of each of the multiple chirps in each of the first plurality of frames.

Example 27. The radar system of any of the preceding examples, wherein the processing unit is configured to determine the respective amplitude for each of the first plurality of frames by applying a Fourier transform to a common receiver signal for the multiple chirps in each of the first plurality of frames.

Example 28. The radar system of any of the preceding examples, wherein the processing unit is configured to determine the common receiver signal for the multiple chirps in each of the first plurality of frames by averaging respective receiver signals of each of the multiple chirps in that frame.

Example 29. The radar system of any of the preceding examples, wherein the processing unit is configured to determine the common receiver signal for the multiple chirps in each of the first plurality of frames by summing respective receiver signals of each of the multiple chirps in that frame.

Example 30. The radar system of any of the preceding examples, wherein the second period of idle time is longer than the first period of multiple chirps.

Example 31. The radar system of any of the preceding examples, wherein the second period of idle time is an order of five magnitudes longer than the first period of multiple chirps.

Example 32. The radar system of any of the preceding examples, wherein the first period is approximately two or more microseconds and the second period is less than approximately 100 milliseconds.

Example 33. The radar system of any of the preceding examples, wherein the processing unit is further configured to: direct the transceiver to generate the chirp pattern in a third frame after the second plurality of frames; determine, based on the standard deviation in amplitude for the second plurality of frames and an amplitude as a function of range for the third frame, a standard deviation in amplitude as a function of range for the third frame; and based on whether the standard deviation in amplitude for the third frame satisfies the adaptive noise threshold, output or refrain from outputting an indication of a living object detected during the third frame.

Example 34. The radar system of any of the preceding examples, wherein the processing unit is further configured to: smooth the standard deviation in amplitude for the second plurality of frames; and set the adaptive noise threshold for the third frame to the smoothed, standard deviation in amplitude for the second plurality of frames.

Example 35. The radar system of any of the preceding examples, wherein the processing unit is further configured to add an offset to the smoothed, standard deviation in amplitude for the second plurality of frames before setting the adaptive noise threshold for the third frame to the smoothed, standard deviation for the second plurality of frames.

Example 36. The radar system of any of the preceding examples, wherein the processing unit is further configured to: output the indication of the living object detected during the third frame in response to the standard deviation for the third frame satisfying the adaptive noise threshold.

Example 37. The radar system of any of the preceding examples, wherein the processing unit is further configured to: determine a previous mean amplitude equal to a mean amplitude for the second plurality of frames; determine a current mean amplitude equal to the previous mean amplitude incremented by a fraction of the amplitude of the third frame, the fraction of the amplitude of the third frame being equal to a difference between the amplitude of the third frame and the previous mean amplitude, the difference being divided by a total quantity of frames among the second plurality of frames and the third frame; determine the standard deviation in amplitude for the third frame by incrementing the baseline standard deviation by an amount determined based on the amplitude of the third frame, the previous mean amplitude, and the current mean amplitude; and store the current mean amplitude as the previous mean amplitude for use in subsequently incrementing the current mean amplitude.

Example 38. The radar system of any of the preceding examples, wherein the amount determined based on the range of the third frame, the previous mean, and the current mean is based on a product of the amplitude of the third frame minus the previous mean amplitude and the amplitude of the third frame minus the current mean amplitude.

Example 39. A computer-readable storage medium comprising instructions that, when executed by a processing unit of a radar system, cause the processing unit to: direct a transceiver to generate, over a first plurality of frames, radar signals having a chirp pattern that has a first period of multiple chirps followed by a second period of idle time; determine a respective amplitude as a function of range for reflections of the radar signals obtained during each of the first plurality of frames; based on the respective amplitude for the reflections obtained during each of the plurality of frames, determine a baseline standard deviation in amplitude as a function of range for the first plurality of frames; adjust an adaptive noise threshold based on a dynamic noise response of the radar system by smoothing the baseline standard deviation for the first plurality of frames and setting the adaptive noise threshold to the baseline standard deviation after the smoothing; and responsive to a standard deviation in amplitude as a function of range for a second plurality of frames generated using the chirp pattern satisfying the adaptive noise threshold, output an indication of a living object detected during the second plurality of frames.

Example 40. A method comprising: generating, by a radar system, over a first plurality of frames, radar signals having a chirp pattern that has a first period of multiple chirps followed by a second period of idle time; determining, by the radar system, a respective amplitude as a function of range for reflections of the radar signals obtained during each of the first plurality of frames; based on the respective amplitude for the reflections obtained during each of the plurality of frames, determining, by the radar system, a baseline standard deviation in amplitude as a function of range for the first plurality of frames; adjusting, by the radar system, an adaptive noise threshold based on a dynamic noise response of the radar system by smoothing the baseline standard deviation for the first plurality of frames and setting the adaptive noise threshold to the baseline standard deviation after the smoothing; and responsive to a standard deviation in amplitude as a function of range for a second plurality of frames generated using the chirp pattern satisfying the adaptive noise threshold, outputting, by the radar system, an indication of a living object detected during the second plurality of frames.

Example 41. A radar system comprising: an antenna array; a transceiver configured to generate radar signals via the antenna array; and a processing unit configured to: direct the transceiver to generate a first plurality of frames of radar signals having a chirp pattern that has a first period of multiple chirps followed by a second period of idle time; apply a Fourier transform to reflections of the radar signals obtained within the first plurality of frames to determine a respective amplitude, as a function of range, for each of the first plurality of frames; determine a first standard deviation in amplitude for the first plurality of frames based on the respective amplitude determined for each of the first plurality of frames; store a previous mean amplitude equal to a mean amplitude for the first plurality of frames; direct the transceiver to generate the chirp pattern in a subsequent frame to the first plurality of frames; determine a current mean amplitude equal to the previous mean amplitude incremented by a fraction of an amplitude, as a function of range, of the subsequent frame, the fraction of the range of the subsequent frame being equal to a difference between the amplitude of the subsequent frame and the previous mean amplitude, the difference being divided by a total quantity of frames among the first plurality of frames and the subsequent frame; determine a second standard deviation in amplitude of the first plurality of frames and the subsequent frame by incrementing the first standard deviation in amplitude by an amount based on the amplitude of the subsequent frame, the previous mean amplitude, and the current mean amplitude; and responsive to the second standard deviation satisfying a noise threshold, output an indication of a living object detected during the first plurality of frames and the subsequent frame.

Example 42. The radar system of any of the preceding examples, wherein the processing unit is further configured to: store the current mean amplitude as the previous mean amplitude for subsequently incrementing the current mean for another subsequent frame.

Example 43. The radar system of any of the preceding examples, wherein the processing unit is further configured to: direct the transceiver to generate the chirp pattern in the other subsequent frame; determine the current mean amplitude being equal to the previous mean amplitude incremented by a fraction of an amplitude, as a function of range, of the other subsequent frame, the fraction of the amplitude of the other subsequent frame being equal to a difference between the amplitude of the other subsequent frame and the previous mean amplitude, the difference being divided by a total quantity of frames among the first plurality of frames, the subsequent frame, and the other subsequent frame; and determine a third standard deviation in amplitude for the first plurality of frames, the subsequent frame, and the other subsequent frame by incrementing the second standard deviation by a function of the range of the subsequent frame, the previous mean, and the current mean; and responsive to the third standard deviation satisfying the noise threshold, output an indication of a living object detected during the first plurality of frames, the subsequent frame, and the other subsequent frame.

Example 44. The radar system of any of the preceding examples, wherein the function of the range of the subsequent frame, the previous mean amplitude, and the current mean amplitude is based on a product of the amplitude of the subsequent frame minus the previous mean amplitude and the amplitude of the subsequent frame minus the current mean amplitude.

Example 45. The radar system of any of the preceding examples, wherein the processing unit is configured to apply the Fourier transform to the first plurality of frames by applying the Fourier transform to respective receiver signals of each of the multiple chirps in each frame.

Example 46. The radar system of any of the preceding examples, wherein the processing unit is further configured to apply the Fourier transform to the first plurality of frames by integrating, using non-coherent integration, results of the applying the Fourier transform to the respective receiver signal of each chirp from the multiple chirps in each frame.

Example 47. The radar system of any of the preceding examples, wherein the processing unit is configured to apply the Fourier transform to the first plurality of frames by applying the Fourier transform to a common receiver signal of the multiple chirps in each frame.

Example 48. The radar system of any of the preceding examples, wherein the processing unit is configured to determine the common receiver signal of the multiple chirps in each frame by averaging the respective receiver signals of the multiple chirps in that frame.

Example 49. The radar system of any of the preceding examples, wherein the processing unit is configured to determine the common receiver signal of the multiple chirps in each frame by summing the respective receiver signals of the multiple chirps in that frame.

Example 50. The radar system of any of the preceding examples, wherein the second period of idle time is longer than the first period of multiple chirps.

Example 51. The radar system of any of the preceding examples, wherein the processing unit is further configured to determine the first standard deviation for the first plurality of frames or the mean amplitude for the first plurality of frames by compensating for false triggers to detections resulting from power drift of the radar system.

Example 52. The radar system of any of the preceding examples, wherein the processing unit is further configured to incrementally compensate for the false triggers to detections resulting from the power drift.

Example 53. The radar system of any of the preceding examples, wherein the noise threshold is a predetermined threshold based on radar characteristics of the radar system.

Example 54. The radar system of any of the preceding examples, wherein the noise threshold is an adaptive noise threshold and the processing unit is further configured to adjust the adaptive noise threshold based on a dynamic noise response of the radar system.

Example 55. The radar system of any of the preceding examples, wherein the first standard deviation is a baseline standard deviation and the processing unit is further configured to: determine the adaptive noise threshold by smoothing the baseline standard deviation and setting the adaptive noise threshold to the baseline standard deviation.

Example 56. The radar system of any of the preceding examples, wherein the processing unit is further configured to add an offset to the baseline standard deviation after smoothing the baseline standard deviation to determine the adaptive noise threshold.

Example 57. The radar system of any of the preceding examples, wherein the processing unit is further configured to: direct the transceiver to generate the chirp pattern in another subsequent frame following the subsequent frame; determine, based in part on the second standard deviation and a respective amplitude for the other subsequent frame, a third standard deviation; and in response to the third standard deviation not satisfying the noise threshold, refrain from outputting an indication of an object detected in the other subsequent frame.

Example 58. The radar system of any of the preceding examples, wherein the transceiver includes a transmitter and the receiver.

Example 59. A computer-readable storage medium comprising instructions that, when executed by a processing unit of a radar system, cause the processing unit to: direct a transmitter and a receiver of the radar system to generate a first plurality of frames of radar signals having a chirp pattern that has a first period of multiple chirps followed by a second period of idle time; apply a Fourier transform to reflections of the radar signals obtained within the first plurality of frames to determine a respective amplitude, as a function of range, for each of the first plurality of frames; determine a first standard deviation in amplitude for the first plurality of frames based on the respective amplitude determined for each of the first plurality of frames; store a previous mean amplitude equal to a mean amplitude for the first plurality of frames; direct the transceiver to generate the chirp pattern in a subsequent frame to the first plurality of frames; determine a current mean amplitude equal to the previous mean amplitude incremented by a fraction of an amplitude, as a function of range, of the subsequent frame, the fraction of the range of the subsequent frame being equal to a difference between the amplitude of the subsequent frame and the previous mean amplitude, the difference being divided by a total quantity of frames among the first plurality of frames and the subsequent frame; determine a second standard deviation in amplitude of the first plurality of frames and the subsequent frame by incrementing the first standard deviation in amplitude by an amount based on the amplitude of the subsequent frame, the previous mean amplitude, and the current mean amplitude; and responsive to the second standard deviation satisfying a noise threshold, output an indication of a living object detected during the first plurality of frames and the subsequent frame.

Example 60. A method comprising: generating, by a radar system, a first plurality of frames of radar signals having a chirp pattern that has a first period of multiple chirps followed by a second period of idle time; applying a Fourier transform to reflections of the radar signals obtained within the first plurality of frames to determine a respective amplitude, as a function of range, for each of the first plurality of frames; determining a first standard deviation in amplitude for the first plurality of frames based on the respective amplitude determined for each of the first plurality of frames; storing, by the radar system, a previous mean amplitude equal to a mean amplitude for the first plurality of frames; generating, by the radar system, the chirp pattern in a subsequent frame to the first plurality of frames; determining a current mean amplitude equal to the previous mean amplitude incremented by a fraction of an amplitude, as a function of range, of the subsequent frame, the fraction of the range of the subsequent frame being equal to a difference between the amplitude of the subsequent frame and the previous mean amplitude, the difference being divided by a total quantity of frames among the first plurality of frames and the subsequent frame; determining a second standard deviation in amplitude of the first plurality of frames and the subsequent frame by incrementing the first standard deviation in amplitude by an amount based on the amplitude of the subsequent frame, the previous mean amplitude, and the current mean amplitude; and responsive to the second standard deviation satisfying a noise threshold, outputting, by the radar system, to a system of a vehicle, an indication of a living object detected in the vehicle during the first plurality of frames and the subsequent frame.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed:

1. A radar system comprising:
an antenna array;
a transceiver configured to generate radar signals via the antenna array; and
a processor configured to:
direct the transceiver to generate, for a plurality of frames, the radar signals having a chirp pattern that has a first period of multiple chirps followed by a second period of idle time, the second period of idle time being longer than the first period of multiple chirps;
apply a Fourier transform to respective reflections of the radar signals obtained during each of the plurality of frames to determine a respective amplitude of the reflections as a function of range for each of the plurality of frames;
based on the respective amplitude of the reflections for each of the plurality of frames, determine a standard deviation in the respective amplitude for the reflections within each of the plurality of frames; and
in response to the standard deviation in the respective amplitude for any of the reflections within the plurality of frames satisfying a noise threshold, output an indication of a living object detected during the plurality of frames.

2. The radar system of claim 1, wherein the processor is configured to determine the respective amplitude of the reflections as a function of range for each of the plurality of frames by applying the Fourier transform to a respective receiver signal of each of the multiple chirps in each frame, the respective receiver signal of each of the multiple chirps in each frame including a respective digital beat signal including respective baseband data.

3. The radar system of claim 2, wherein the processor is further configured to determine the respective amplitude of the reflections as a function of range for each of the plurality of frames by integrating, using non-coherent integration, results of the applying the Fourier transform to the respective receiver signal of each chirp of the multiple chirps in each frame over the plurality of frames.

4. The radar system of claim 1, wherein the processor is configured to apply the Fourier transform to the multiple chirps by applying the Fourier transform to a common receiver signal for the multiple chirps in each frame over the plurality of frames, the common receiver signal being representative of the multiple chirps in each frame.

5. The radar system of claim 4, wherein the processor is configured to determine the common receiver signal for the multiple chirps in each frame by averaging respective receiver signals of each of the multiple chirps in that frame.

6. The radar system of claim 4, wherein the processor is configured to determine the common receiver signal for the multiple chirps in each frame by summing respective receiver signals of each of the multiple chirps in that frame.

7. The radar system of claim 1, wherein:
the radar system is integrated in a vehicle;
a field-of-view of the radar system includes one or more areas occupied by passengers of the vehicle;
the indication of the living object detected during the plurality of frames is an indication of a passenger of the vehicle; and
the processor is further configured to output the indication of the passenger of the vehicle to an alert system that is configured to output an alert about the passenger of the vehicle.

8. The radar system of claim 1, wherein the the multiple chirps have individual frequencies that increase or decrease at a constant value over time.

9. The radar system of claim 1, wherein the first period is approximately two or more microseconds and the second period is less than approximately 100 milliseconds.

10. The radar system of claim 1, wherein the noise threshold is a predetermined threshold based on predetermined characteristics of the radar system.

11. The radar system of claim 1, wherein the noise threshold is an adaptive noise threshold as a function of range and the processor is further configured to adjust the adaptive noise threshold based on a dynamic noise response of the radar system.

12. The radar system of claim 1, wherein the standard deviation is a current standard deviation, the processor is further configured to:
determine a baseline standard deviation in amplitude for reflections obtained in at least two prior frames based on a respective amplitude as a function of range for each of the at least two prior frames; and
determine the adaptive noise threshold by smoothing the baseline standard deviation and setting the adaptive noise threshold to the smoothed baseline standard deviation.

13. The radar system of claim 12, wherein the processor is further configured to add an offset to the smoothed baseline standard deviation after smoothing the baseline standard deviation to determine the adaptive noise threshold.

14. The radar system of claim 1, wherein the standard deviation is a first standard deviation, wherein the processor is further configured to:
direct the transceiver to generate, for a subsequent frame, the chirp pattern that has the first period of multiple chirps followed by the second period of idle time;
determine, based in part on the first standard deviation and a respective amplitude as a function of range for the subsequent frame, a second standard deviation in the respective amplitude for the reflections within the subsequent frame and each of the plurality of frames; and
in response to the second standard deviation not satisfying the noise threshold, refrain from outputting the indication of the object.

15. The radar system of claim 1, wherein the standard deviation is a first standard deviation, wherein the processor is further configured to:
direct the transceiver to generate, for a subsequent frame, the chirp pattern that has the first period of multiple chirps followed by the second period of idle time;
determine, based in part on the first standard deviation and an amplitude as a function of range for the subsequent frame, a second standard deviation as a function of range in the amplitude for the reflections within the subsequent frame and each of the plurality of frames; and
in response to the second standard deviation satisfying the noise threshold, output the indication of the object.

16. The radar system of claim 15, wherein the processor is further configured to:
determine a previous mean amplitude equal to a mean amplitude for the plurality of frames;
determine a current mean amplitude equal to the previous mean amplitude incremented by a fraction of the amplitude of the subsequent frame, the fraction of the amplitude of the subsequent frame being equal to a difference between the range of the subsequent frame and the previous mean, the difference being divided by a total quantity of frames among the plurality of frames and the subsequent frame; and determine the second standard deviation by incrementing the first standard deviation according to a function of the amplitude of the subsequent frame, the previous mean amplitude, and the current mean amplitude.

17. The radar system of claim 16, wherein the function of the amplitude of the subsequent frame, the previous mean amplitude, and the current mean amplitude computes a product of a first difference between the amplitude of the subsequent frame and the previous mean amplitude and a second difference between the amplitude of the subsequent frame and the current mean amplitude.

18. The radar system of claim 16, wherein the processor is further configured to store the current mean amplitude as the previous mean amplitude for use in subsequently determining a new, current mean in response to a new frame.

19. A non-transitory computer-readable storage medium comprising instructions that, when executed by a processor of a radar system, cause the processor to:

direct a transceiver of the radar system to generate a plurality of frames of radar signals having a chirp pattern that has a first period of multiple chirps followed by a second period of idle time, the second period of idle time being longer than the first period of multiple chirps;

apply a Fourier transform to respective reflections obtained during the first period of each of the plurality of frames to determine a respective amplitude of the reflections as a function of range for each of the plurality of frames;

based on the respective amplitude of the reflections for each of the plurality of frames, determine a standard deviation in the respective amplitude for the reflections within each of the plurality of frames; and in response to the standard deviation in the respective amplitude for any of the reflections within the plurality of frames satisfying a noise threshold, output an indication of a living object detected during the plurality of frames.

20. A method comprising:

generating, by a radar system, a plurality of frames of radar signals having a chirp pattern that has a first period of multiple chirps followed by a second period of idle time, the second period of idle time being longer than the first period of multiple chirps;

applying, by the radar system, a Fourier transform to respective reflections obtained during the generating of the first period of each of the plurality of frames to determine a respective amplitude of the reflections as a function of range for each of the plurality of frames;

based on the respective amplitude of the reflections for each of the plurality of frames, determining, by the radar system, a standard deviation in the respective amplitude for the reflections within each of the plurality of frames; and in response to the standard deviation in the respective amplitude for any of the reflections within the plurality of frames satisfying a noise threshold, output an indication of a living object detected during the plurality of frames.

* * * * *